(12) United States Patent
Ishikawa et al.

(10) Patent No.: US 7,022,977 B2
(45) Date of Patent: Apr. 4, 2006

(54) LIGHT BEAM SCANNING APPARATUS

(75) Inventors: Daisuke Ishikawa, Sunto-gun (JP);
Koji Tanimoto, Tagata-gun (JP);
Kenichi Komiya, Kawasaki (JP); Koji Kawai, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 371 days.

(21) Appl. No.: 10/457,504

(22) Filed: Jun. 10, 2003

(65) Prior Publication Data

US 2003/0226960 A1 Dec. 11, 2003

(30) Foreign Application Priority Data

Jun. 11, 2002 (JP) ............................. 2002-170013

(51) Int. Cl.
*B41J 2/435* (2006.01)
*G02B 26/10* (2006.01)

(52) U.S. Cl. ........................ 250/234; 347/235; 347/250

(58) Field of Classification Search ........ 250/234–236; 347/233–235, 248–250; 359/204, 212, 216, 359/217; 358/474, 481, 493, 494
See application file for complete search history.

(56) References Cited

U.S. PATENT DOCUMENTS

| | | | |
|---|---|---|---|
| 5,883,385 A | 3/1999 | Takahashi et al. | |
| 5,929,891 A | 7/1999 | Komiya et al. | |
| 6,392,684 B1 | 5/2002 | Tanimoto et al. | |
| 6,426,767 B1 | 7/2002 | Tanimoto et al. | |
| 6,462,855 B1 | 10/2002 | Komiya et al. | |
| 6,496,212 B1 | 12/2002 | Tanimoto et al. | |
| 6,509,921 B1 | 1/2003 | Komiya et al. | |
| 6,611,279 B1 * | 8/2003 | Komiya et al. | 347/235 |
| 6,639,620 B1 * | 10/2003 | Ishikawa et al. | 347/235 |
| 6,646,668 B1 * | 11/2003 | Tanimoto et al. | 347/234 |
| 6,768,562 B1 * | 7/2004 | Takada et al. | 358/296 |
| 6,836,279 B1 * | 12/2004 | Komiya et al. | 347/235 |
| 6,839,073 B1 * | 1/2005 | Kawai et al. | 347/234 |
| 2002/0105574 A1 | 8/2002 | Tanimoto et al. | |
| 2002/0154204 A1 | 10/2002 | Tanimoto et al. | |
| 2003/0063298 A1 | 4/2003 | Komiya et al. | |
| 2003/0067530 A1 | 4/2003 | Ishikawa et al. | |

FOREIGN PATENT DOCUMENTS

JP 9-189873 A 7/1997

OTHER PUBLICATIONS

U.S. Appl. No. 10/457,742, filed Jun. 10, 2003, Kawai et al.
U.S. Appl. No. 10/445,842, filed May 28, 2003, Komiya et al.

* cited by examiner

*Primary Examiner*—Stephone B. Allen
(74) *Attorney, Agent, or Firm*—Foley & Lardner LLP

(57) ABSTRACT

A main control section controls a movable beam a such that a passage position thereof may come to a center of a gap between a sensor SK and a sensor SJ, and measures an output difference between a sensor SP and a sensor SO. In this case, the main control section successively measures an output difference between the sensors SP and SO while moving the movable beam a to the center of the gap between the sensors SK and SJ. Similarly, the main control section controls the movable beam a such that the passage position thereof may come to a center of a gap between the sensor SJ and a sensor SI.

2 Claims, 25 Drawing Sheets

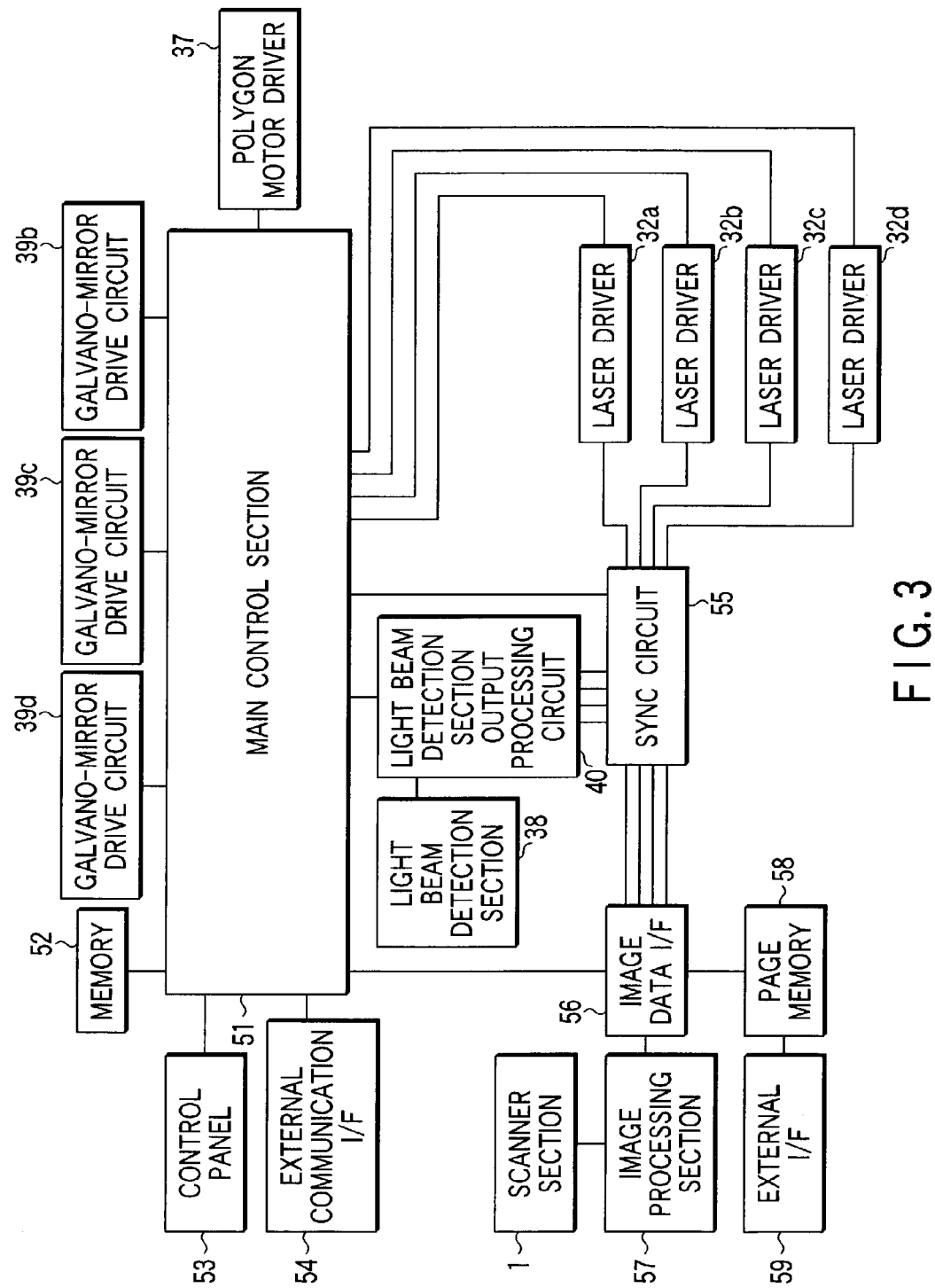
F I G. 3

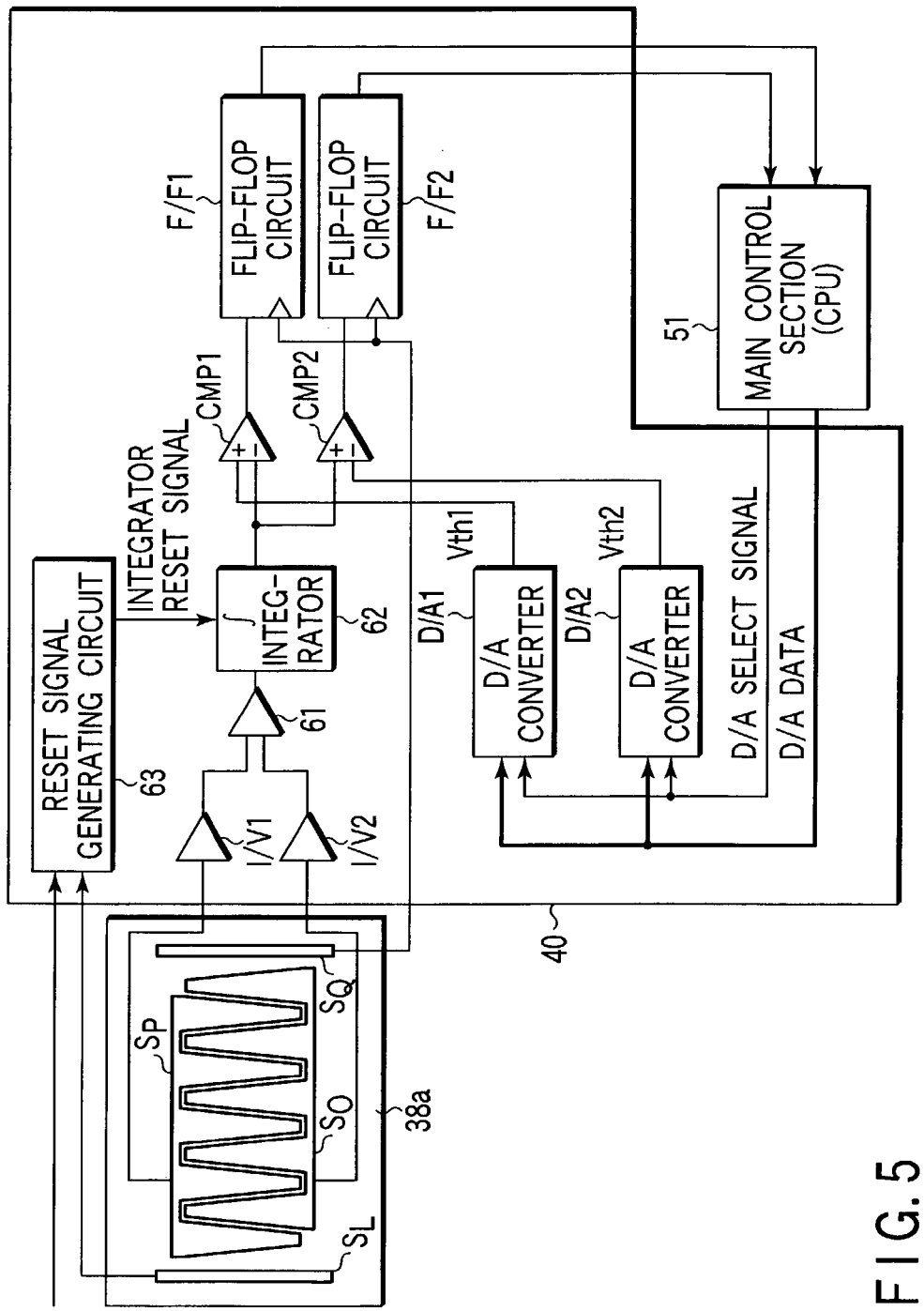
F I G. 5

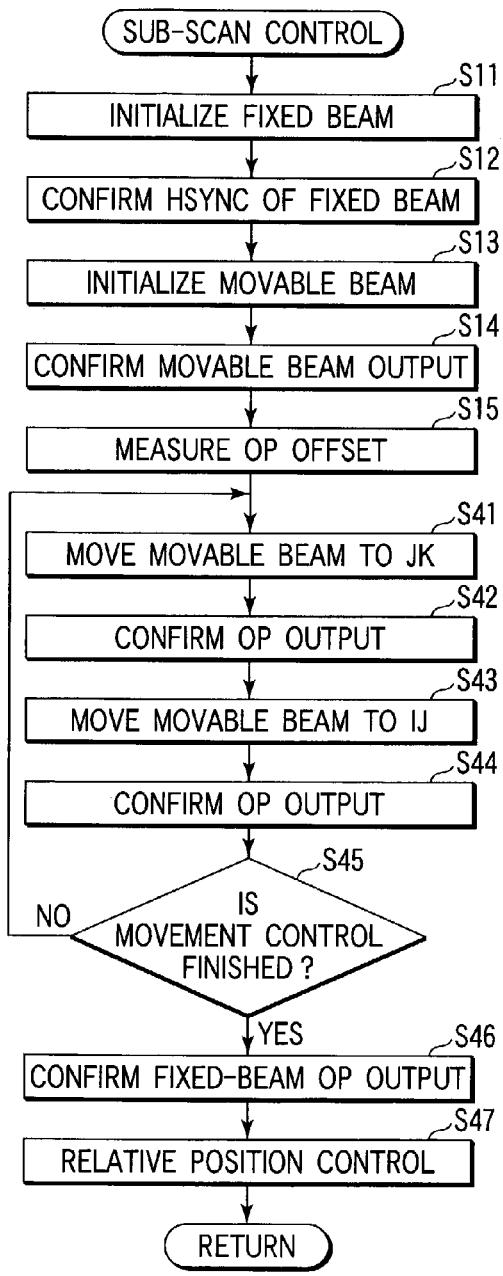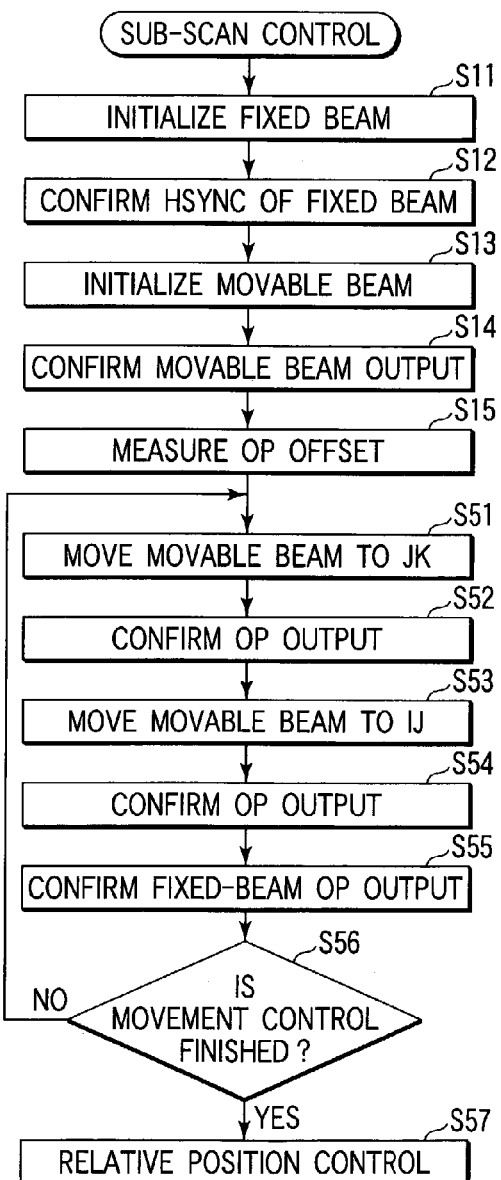
FIG. 25
FIG. 29

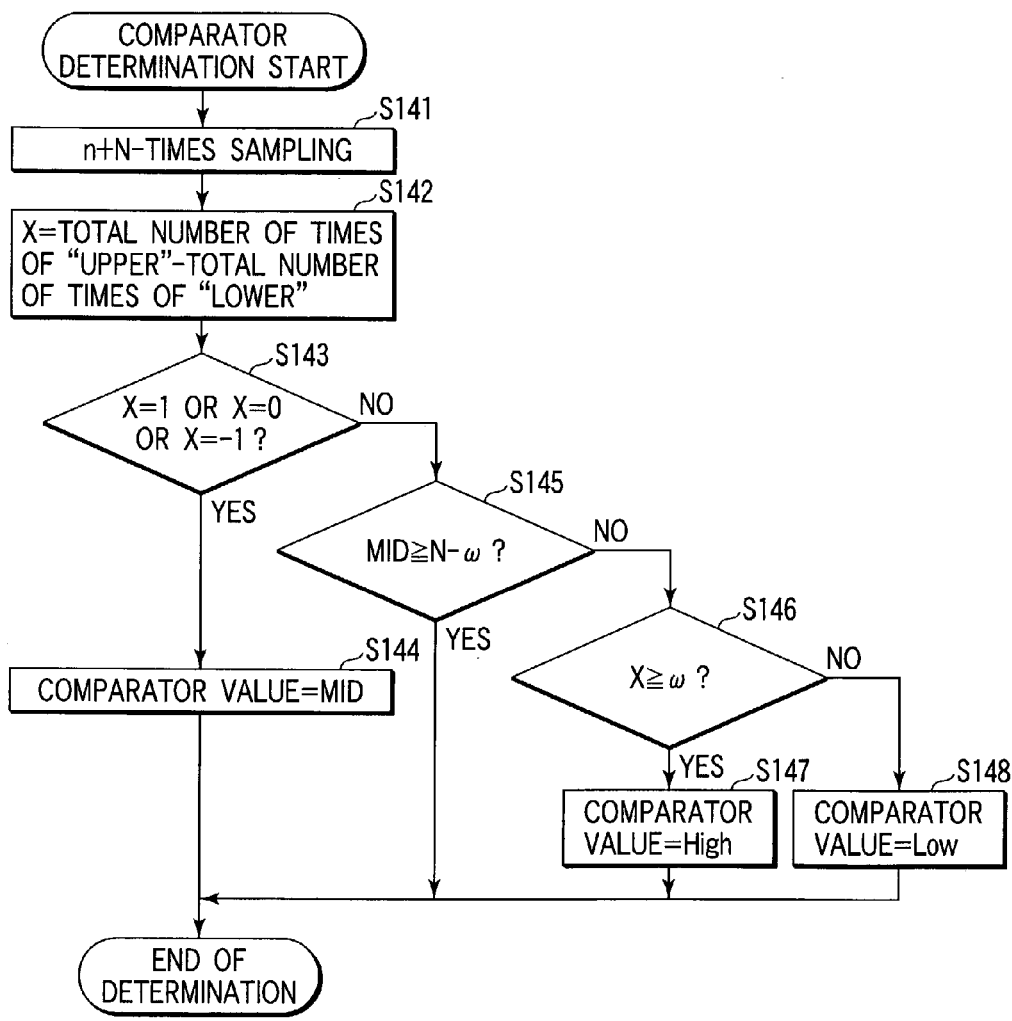
F I G. 38

LIGHT BEAM SCANNING APPARATUS

CROSS-REFERENCE TO RELATED APPLICATIONS

This application is based upon and claims the benefit of priority from the prior Japanese Patent Application No. 2002-170013, filed Jun. 11, 2002, the entire contents of which are incorporated herein by reference.

BACKGROUND OF THE INVENTION

1. Field of the Invention

The present invention relates to a light beam scanning apparatus for scanning a plurality of laser light beams in an image forming apparatus, such as a digital copying machine or a laser printer, which exposes a single photosensitive drum by simultaneously scanning a plurality of laser light beams over the photosensitive drum, thereby forming a single electrostatic latent image on the photosensitive drum.

2. Description of the Related Art

In these years, various kinds of digital copying machines have been developed, which perform image formation, for example, by scan/exposure using a laser light beam (hereinafter referred to as "light beam") and an electrophotographic process.

A digital copying machine that uses a multi-beam system has recently been developed. In this digital copying machine, a plurality of light beams are produced to perform simultaneous scan in units of a plurality of lines, thus increasing the speed of image formation.

The digital copying machine using the multi-beam system comprises a plurality of semiconductor laser oscillators for producing light beams; a multifaceted rotary mirror, such as a polygon mirror, which reflects the light beams from the laser oscillators toward the photosensitive drum and causes the light beams to scan the photosensitive drum; and an optical system unit functioning as a light beam scanning apparatus, which includes a collimator lens and an f-θ lens as main components.

In the conventional multi-beam type digital copying machine, in order to form a high-quality image, the optical system unit performs a scan-directional exposure position control of light beams (i.e. light beam position control in a main scan direction) and a light beam passage position control (i.e. light beam position control in a sub-scan direction).

An example of this technique is proposed in Japanese Patent Application No. 11-270894. The proposed technique aims at performing a light beam position control by detecting light beams with high precision over a wide range. A pair of sensors detect a sub-scan-directional passage point of a light beam that scans the surface of the photosensitive drum.

The scan position of the light beam is determined on the basis of a value that is obtained by integrating a difference between outputs of the paired sensors. The integration value indicative of the beam scan position is computed by a processing circuit connected to the paired sensors. The processing circuit comprises a plurality of operational amplifiers, and a difference between electric signals detected by the sensors is integrated by an integrator.

Japanese Patent Application No. 2001-290204 proposes a technique wherein a pair of sensors for sensing light beams comprise two sawtooth-shaped patterns. In this proposed technique, like the technique of Japanese Patent Application No. 11-270894, the beam scan position is determined by a processing circuit that integrates a difference between outputs of the paired sensors.

Further, Japanese Patent Application No. 11-270894 or Japanese Patent Application No. 2001-290204 proposes a technique wherein in a case where an output from a processing circuit that processes output signals from the paired sensors is saturated, the output signals from the paired sensors are corrected, thereby detecting the beam scan position.

There is also a proposed method of efficiently determining and controlling the amount of correction.

However, even if control operations are performed, the controlled beam position may deviate due to a drift or a time-dependent variation of a galvano-mirror, leading to degradation in output image quality.

In addition, when the beam position is detected, a window comparator is used to adjust an instruction range, and measurement is effected by determining whether the beam position is in an upper region, a middle region or a lower region of the range. The method of determining the upper, middle, lower regions is performed by acquiring data units corresponding to the number of polygonal facets of the polygon mirror. A length of time is consumed in setting the width (range) of the window, and exact determination cannot be performed.

Moreover, data set in D/A converters is frequently rewritten due to noise, etc., and exact control cannot be performed. Consequently, an exact control result cannot be output.

BRIEF SUMMARY OF THE INVENTION

The object of the present invention is to provide a light beam scanning apparatus capable of performing an exact, high-precision control, and preventing degradation in image quality.

In order to achieve the object, this invention may provide a light beam scanning apparatus comprising: light-emission means for outputting a light beam; light beam scanning means for scanning the light beam from the light-emission means over a to-be-scanned surface so as to scan the to-be-scanned surface in a main scan direction; first detection means for detecting a passage position of the light beam scanned by the light beam scanning means; processing means for determining whether correction is necessary in a process relating to a detection result of the first detection means, and setting a correction amount if the correction is necessary, thus performing a process for the detection result; altering means for altering the passage position of the light beam scanned by the light beam scanning means over the to-be-scanned surface; second detection means for detecting whether the passage position of the light beam altered by the altering means coincides with a reference position; first control means for altering, if the passage position of the light beam detected by the second detection means is not coincident with the reference position, the passage position of the light beam toward the reference position by a given amount using the altering means until the passage position comes to the reference position, and controlling the detection by the first detection means and the processing by the processing means each time alteration is made; and second control means for controlling the detection by the first detection means and a non-correction process by the processing means when the passage position of the light beam detected by the second detection means comes to the reference position by the control of the first control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing an example of the structure of a control system of the optical system;

FIG. 5 is a block diagram showing the structure of a processing circuit that processes an output signal from the light beam detection section;

FIG. 25 is a flow chart illustrating a sub-scan control according to a second embodiment of the invention;

FIG. 29 is a flow chart illustrating a sub-scan control according to a third embodiment of the invention;

FIG. 38 is a flow chart illustrating determination by a window comparator according to an eighth embodiment of the invention.

DETAILED DESCRIPTION OF THE INVENTION

Embodiments of the present invention will now be described with reference to the accompanying drawings.

To begin with, a light beam scanning apparatus and an image forming apparatus, to which each embodiment of the invention is applied, will be described.

Figure 1:
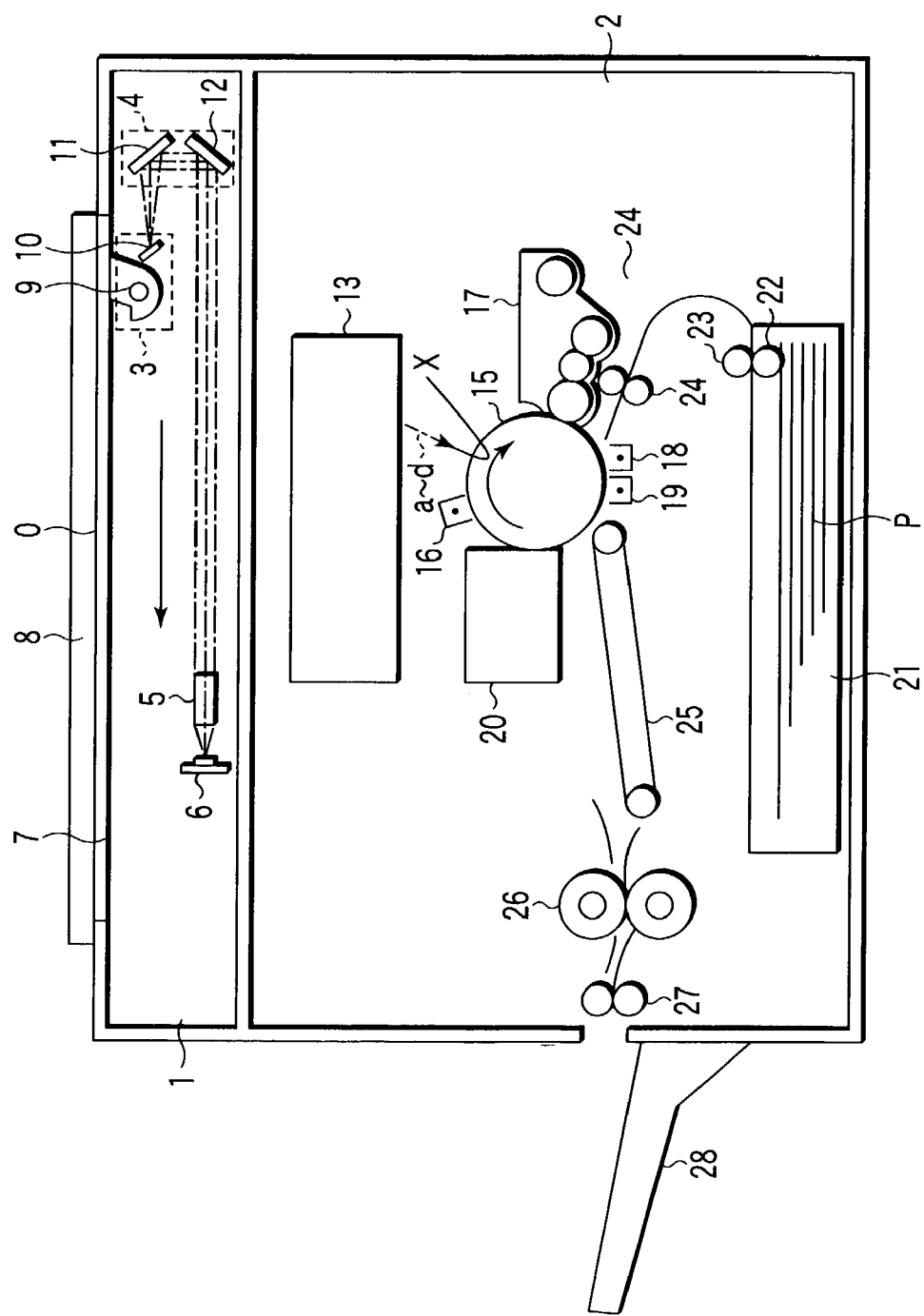
FIG. 1 schematically shows the structure of a digital copying machine.

FIG. 1 schematically shows the structure of a digital copying machine functioning as an image forming apparatus to which the light beam scanning apparatus is applied. The digital copying machine includes a scanner section 1 that scans an image, and a printer section 2 that forms an image on an image formation medium. The scanner section 1 includes a first carriage 3 and a second carriage 4, which are movable in a direction of an arrow in FIG. 1, and a focusing lens 5, and a photoelectric conversion element 6.

In FIG. 1, an original O is placed downward on an original table 7 formed of transparent glass. The original O is held on the original table 7 by an original hold cover 8 that is openably provided.

The original O is illuminated by a light source 9, and the reflective light is converged on a light receiving surface of the photoelectric conversion element 6 via mirrors 10, 11 and 12 and focusing lens 5. The first carriage 3 having the light source 9 and mirror 10 and the second carriage 4 having the mirrors 11 and 12 are moved at a relative speed of 2:1 so that the length of the optical path is made constant. The first carriage 3 and second carriage 4 move from the right to the left by a carriage drive motor (not shown) in synchronism with a scan timing signal.

An image on the original O placed on the original table 7 is successively scanned line by line by the scanner section 1.

A scan output is converted to an 8-bit digital image signal indicative of the density of the image by an image processing section (not shown).

The printer section 2 comprises an optical system unit (light beam scanning apparatus) 13 and an image forming section 14 combined with an electrophotographic system capable of forming an image on a paper sheet P that is an image formation medium. Specifically, an image signal read from the original O by the scanner section 1 is processed by the image processing section (not shown) and then converted to a laser light beam (hereinafter referred to as "light beam") that is to be emitted from a semiconductor laser oscillator.

In the description below, it is assumed that the optical system unit 13 is a multi-beam optical system unit using a plurality (e.g. four) of semiconductor laser oscillators. Note that a single-beam optical system unit comprising only one semiconductor laser oscillator operates like a multi-beam optical system unit, except for a relative position control of plural light beams.

The plural semiconductor laser oscillators provided in the optical system unit 13 operate to emit a plurality of light beams in accordance with laser modulation signals delivered from the image processing section (not shown). The plural light beams are reflected by a polygon mirror and the reflected light beams are emitted as scan beams to the outside of the unit. The details of the optical system unit 13 will be described later.

The plural light beams output from the optical system unit 13 are focused as light spots with necessary resolution at an exposure position X on a photosensitive drum 15 serving as an image carrying member. The focused light spots are made to scan the photosensitive drum 15 in a main scan direction (a direction along the rotational axis of the photosensitive drum). Further, the photosensitive drum 15 is rotated and an electrostatic latent image corresponding to the image signal is formed on the photosensitive drum 15.

The photosensitive drum 15 is surrounded by a charger 16 that charges the surface of the photosensitive drum 15, a developing device 17, a transfer charger 18, a separation charger 19 and a cleaner 20. The photosensitive drum 15 is rotated by a drive motor (not shown) at a predetermined circumferential speed, and is charged by the charger 16 disposed to face the surface of the photosensitive drum 15. The plural light beams are focused as light spots at the exposure position X on the charged photosensitive drum 15, the light spots being arranged in a sub-scan direction (a direction of movement of the surface of the photosensitive drum).

Toner (developer) is applied from the developing device 17 to an electrostatic latent image formed on the photosensitive drum 15, and thus the electrostatic latent image is developed into a toner image. The toner image formed on the photosensitive drum 15 is transferred by the transfer charger 18 onto a paper sheet P that is fed from a sheet feed system at a predetermined timing.

In the sheet feed system, paper sheets P contained in a sheet feed cassette 21 disposed at the bottom of the printer section 2 are separated one by one and fed by a feed roller 22 and a separation roller 23. The sheet P is conveyed to a register roller 24 and fed to a transfer position at a predetermined timing. A sheet convey mechanism 25, a fixing device 26, and an output roller 27 that outputs the sheet P on which the image has been formed, are disposed on the downstream side of the transfer charger 18. The toner image, which is transferred on the sheet P, is fixed by the fixing device 26. The sheet P with the fixed image is discharged onto an external output tray 28 via an output roller 27.

Residual toner on the surface of the photosensitive drum 15, from which the toner image has been transferred on the sheet P, is removed by the cleaner 20. Thereby, the surface of the photosensitive drum 15 is restored to its initial state, and the photosensitive drum 15 is set in the standby state for the next image forming operation.

The above-described process is repeated, and the image forming operations are performed in succession.

As has been described above, the original O placed on the original table 7 is read by the scanner section 1. The read information is subjected to a series of processes in the printer section 2 and then recorded as a toner image on the sheet P.

Next, the optical system unit (light beam scanning apparatus) 13 will be described.

Figure 2:
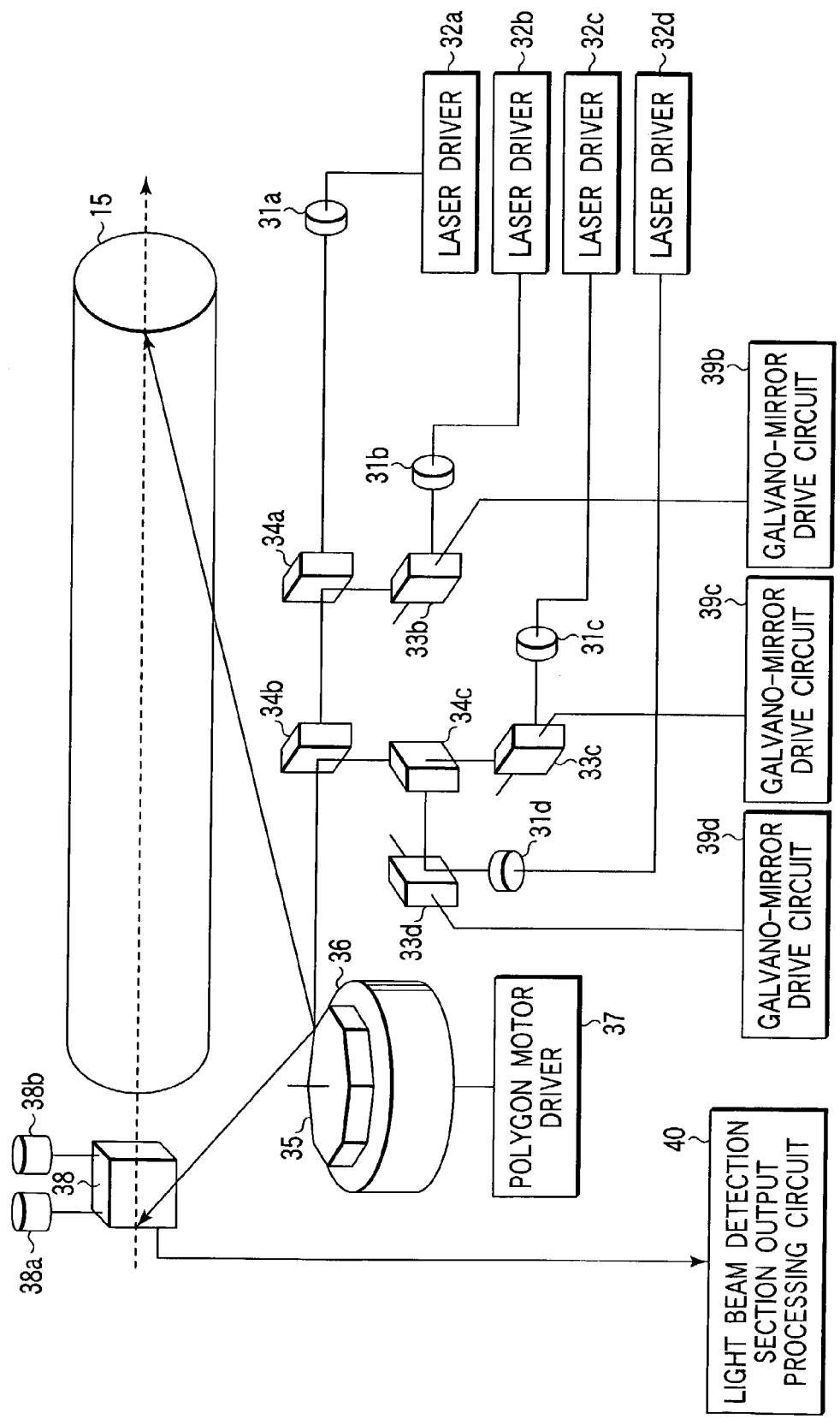
FIG. 2 schematically shows the structure of an optical system unit.

FIG. 2 shows a positional relationship between the structure of the multi-beam optical system unit 13 and the photosensitive drum 15. Note that a single-beam optical system unit has the same structure as shown in FIG. 2, except that the single-beam optical system unit is configured to control a single light beam.

As is shown in FIG. 2, the multi-beam optical system unit 13 includes, for example, four semiconductor laser oscillators 31a, 31b, 31c and 31d that emit four light beams. The laser oscillators 31a to 31d can simultaneously perform image formation in units of one scan line. Thereby, the multi-beam optical system unit can perform high-speed image formation, without the need to excessively increase the number of revolutions of the polygon mirror.

The semiconductor laser oscillator 31a is driven by a laser driver 32a. A light beam emitted from the semiconductor laser oscillator 31a passes through a collimator lens (not shown), then through a half-mirror 34a and a half-mirror 34b, and falls on a polygon mirror 35 serving as a multi-faceted rotary mirror.

The polygon mirror 35 is rotated at a constant speed by a polygon motor 36 driven by a polygon motor driver 37. Thereby, reflective light from the polygon mirror 35 scans the photosensitive drum in a fixed direction with an angular speed determined by the number of revolutions of the polygon motor 36. The light beam scanned by the polygon mirror 35 passes through an f-θ lens (not shown). Then, at a constant speed based on f-θ characteristics, the light beam scans the light receiving surface of a light beam detection section 38 that detects a light beam position, a light beam passage timing and beam power, and the photosensitive drum 15.

The semiconductor laser oscillator 31b is driven by a laser driver 32b. A light beam emitted from the semiconductor laser oscillator 31b passes through a collimator lens (not shown), and is then reflected by a galvano-mirror 33b and also reflected by the half-mirror 34a. The reflective light from the half-mirror 34a passes through the half-mirror 34b and falls on the polygon mirror 35. The optical path after the polygon mirror 35 is the same as in the case of the above-described laser oscillator 31a. That is, the light beam passes through the f-θ lens (not shown) and scans the light receiving surface of the light beam detection section 38 and the photosensitive drum 15 at a constant speed.

The semiconductor laser oscillator 31c is driven by a laser driver 32c. A light beam emitted from the semiconductor laser oscillator 31c passes through a collimator lens (not shown), is reflected by a galvano-mirror 33c, passes through a half-mirror 34c, is reflected by the half-mirror 34b, and falls on the polygon mirror 35. The optical path after the polygon mirror 35 is the same as in the case of the above-described laser oscillators 31a and 31b. That is, the light beam passes through the f-θ lens (not shown) and scans the light receiving surface of the light beam detection section 38 and the photosensitive drum 15 at a constant speed.

The semiconductor laser oscillator 31d is driven by a laser driver 32d. A light beam emitted from the semiconductor laser oscillator 31d passes through a collimator lens (not shown), is reflected by a galvano-mirror 33d, the half-mirror 34c and the half-mirror 34b, and falls on the polygon mirror 35. The optical path after the polygon mirror 35 is the same as in the case of the above-described laser oscillators 31a, 31b and 31c. That is, the light beam passes through the f-θ lens (not shown) and scans the light receiving surface of the light beam detection section 38 and the photosensitive drum 15 at a constant speed.

Each of the laser drivers 32a to 32d includes an auto-power control (APC) circuit. The laser drivers 32a to 32d cause the laser oscillators 31a to 31d to constantly emit light beams with emission power levels set by a main control section (CPU) 51 (to be described later).

As has been described above, the light beams emitted from the individual laser oscillators 31a, 31b, 31c and 31d pass through or are reflected by the half-mirrors 34a, 34b and 34c, and then travel toward the polygon mirror 35 as four light beams. Accordingly, the four light beams can simultaneously scan the photosensitive drum 15.

The galvano-mirrors 33b, 33c and 33d are driven by galvano-mirror drive circuits 39b, 39c and 39d, respectively, to adjust (control) the positions in the sub-scan direction of the light beams emitted from the laser oscillators 31b, 31c and 31d, relative to the position of the light beam emitted from the laser oscillator 31a.

In addition, the light beam detection section 38 is equipped with light beam detection section adjusting motors 38a and 38b for adjusting the position of attachment of the light beam detection section 38 and the angle of the light beam detection section 38 relative to the scan direction of the light beams.

The light beam detection section 38 detects the passage positions, passage timing and power (i.e. light amount) of the four light beams. The light beam detection section 38 is disposed near an end portion of the photosensitive drum 15, and its light receiving surface corresponds in position to the surface of the photosensitive drum 15. Based on detection signals from the light beam detection section 38, the galvano-mirrors 33b, 33c and 33d associated with the light beams are controlled (i.e. sub-scan-directional image formation position control), the light emission power of each laser oscillator 31a, 31b, 31c, 31d is controlled, and the light emission timing is controlled (i.e. main-scan-directional image formation position control) (as will be described later in greater detail). In order to produce signals for these controls, a light beam detection section output processing circuit (processing circuit) 40 is connected to the light beam detection section 38.

A control system of the digital copying machine will now be described.

FIG. 3 shows the structure of the control system of the digital copying machine including the multi-beam optical system unit. Reference numeral 51 denotes a main control section that controls the entirety of the digital copying machine. The main control section 51 comprises, e.g. a CPU. The main control section 51 is connected to a memory 52, a control panel 53, an external communication interface (I/F) 54, laser drivers 32a, 32b, 32c and 32d, polygon motor driver 37, galvano-mirror drive circuits 39b, 39c and 39d, light beam detection section output processing circuit 40, a sync circuit 55, and an image data interface (I/F) 56.

The image data I/F 56 is connected to the sync circuit 55. An image processing section 57 and a page memory 58 are connected to the image data I/F 56. The scanner section 1 is connected to the image processing section 57. An external interface (I/F) 59 is connected to the page memory 58.

A flow of image data in the case of forming an image may be summarized as follows.

In a copying operation, as described above, the image on the original O placed on the original table 7 is read by the scanner section 1, and the read image signal is delivered to the image processing section 57. The image processing section 57 subjects the image signal from the scanner section 1 to, for instance, well-known shading correction, various filtering processing, tone adjustment, and gamma correction.

The image processing section 57 outputs the processed image data to the image data I/F 56. The image data I/F 56 functions to sort the image data to the four laser drivers 32a, 32b, 32c and 32d.

The sync circuit 55 generates a clock in sync with the timing at which each light beam passes over the light beam detection section 38. In sync with the clock, image data is sent from the image data I/F 56 as laser modulation signals to the laser drivers 32a, 32b, 32c and 32d.

The sync circuit 55 includes a sample timer and a logic circuit. The sample timer forcibly causes the laser oscillators 31a, 31b, 31c and 31d to emit light beams on a non-image area, thereby to control the power of each light beam. The logic circuit causes each laser oscillator 31a, 31b, 31c, 31d to emit a light beam at the time of scanning the light beam detection section 38, thereby to detect the main-scan-directional position of each light beam.

In this manner, the image data is transferred in sync with the scanning of each light beam, whereby image formation can be performed (at a correct position) with synchronism in the main scan direction.

The control panel 53 is a man-machine interface for instructing the start of the copying operation, setting the number of copies, etc.

This digital copying machine is designed to perform not only the copying operation, but also an image forming operation based on image data input from the outside via the external I/F 59 connected to the page memory 58. The image data input from the external I/F 59 is once stored in the page memory 58 and then sent to the sync circuit 55 via the image data I/F 56.

In a case where the digital copying machine is controlled from the outside via a network or the like, the external communication I/F 54 plays the role of the control panel 53.

The galvano-mirror drive circuits 39b, 39c and 39d are circuits for driving the galvano-mirrors 33b, 33c and 33d in accordance with instruction values from the main control section 51. Accordingly, the main control section 51 can freely control the angle of each galvano-mirror 33b, 33c, 33d through the galvano-mirror drive circuits 39b, 39c and 39d.

The polygon motor driver 37 is a driver for driving the polygon motor 36 that rotates the polygon mirror 35 for scanning the four light beams. The main control section 51 can instruct the start/stop of rotation and the change in the number of revolutions for the polygon motor driver 37. When the beam passage position is determined by the light beam detection section 38, the polygon motor 36 is rotated at a speed lower than the speed at the time of image formation.

The laser drivers 32a, 32b, 32c and 32d have the function of causing the laser oscillators 31a, 31b, 31c and 31d to emit light beams on the basis of the image data, as mentioned above. In addition, the laser drivers 32a, 32b, 32c and 32d have a function of causing the laser oscillators 31a, 31b, 31c and 31d to forcibly emit light beams irrespective of image data, in response to forcible light emission signals from the main control section 51.

The main control section 51 uses the laser drivers 32a, 32b, 32c and 32d to set the power of each light beam to be emitted from the laser oscillators 31a, 31b, 31c and 31d. The setting of the light beam power is altered in accordance with a variation in process conditions, a detection result of beam passage positions, etc.

The memory 52 stores information necessary for controls. The memory 52 stores, for instance, control amounts of the galvano-mirrors 33b, 33c and 33d, various characteristics (e.g. off-set values of amplifiers) of the processing circuit for detecting light beam passage positions, the order of incoming light beams, etc. Based on the values stored in the memory 52, the control operations immediately after switching-on, for example, can be performed quickly.

A first operational example of the light beam scanning apparatus will now be described.

The first operational example relates to the light beam passage position detection and control in the light beam scanning apparatus having a single-beam optical system that performs scanning by using a single light beam.

Figure 4:
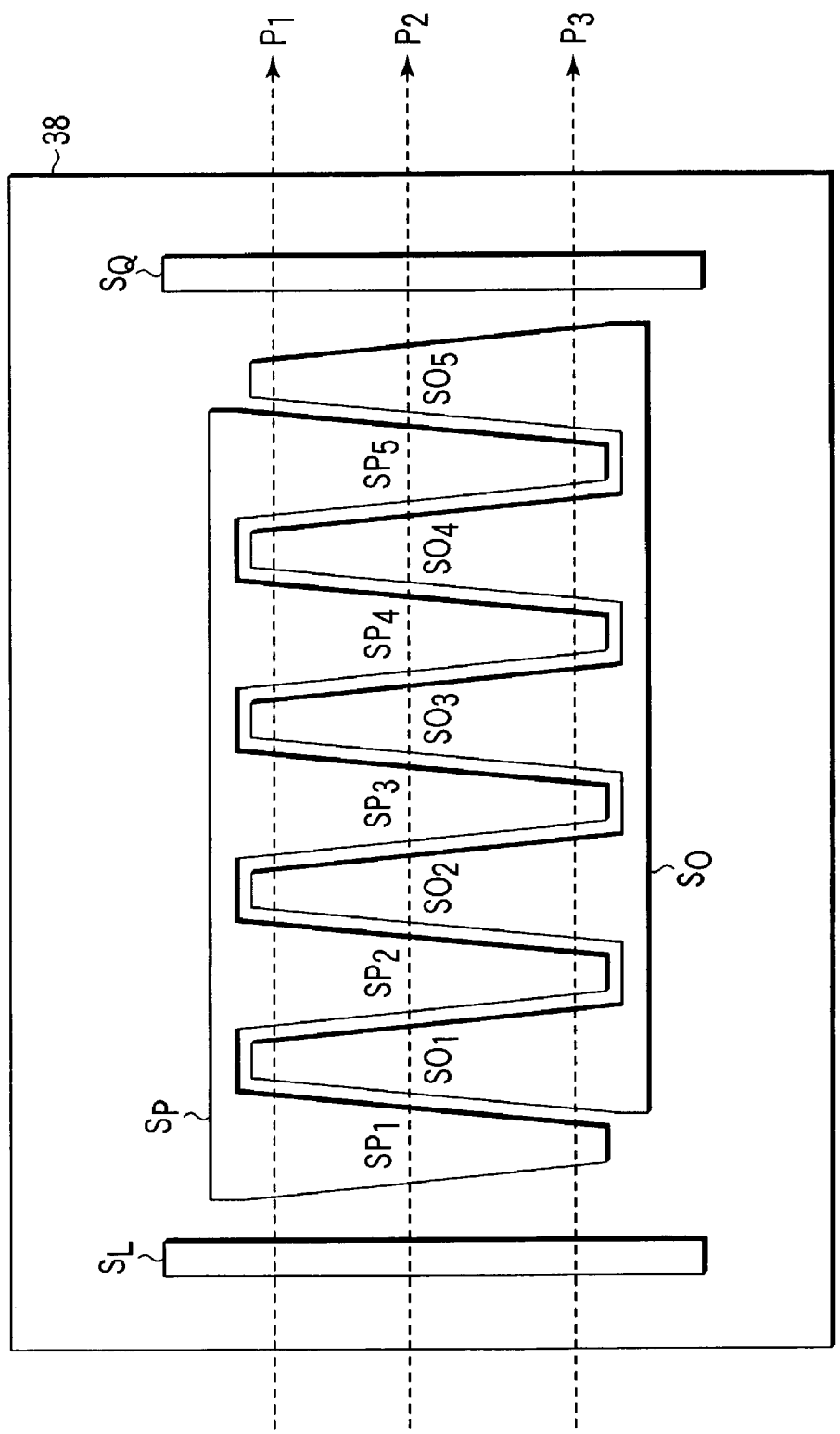
FIG. 4 shows the structure of a light beam detection section.

FIG. 4 shows the relationship between the structure of the light beam detection section 38 and the scan direction of light beams. A light beam emitted from one semiconductor laser oscillator is scanned from the left to the right by the rotation of the polygon mirror 35, and the light beam traverses the light beam detection section 38.

The light beam detection section 38 comprises two vertically elongated sensors SL and SQ, a pair of sensors (sensor patterns) SP and SO sandwiched between the two sensors SL and SQ, and a holder plate that holds these sensors as one piece.

The sensor SL is a sensor that senses the passing of the light beam and produces a reset signal (integration start signal) for an integrator (to be described later). The reset signal is a signal for releasing a charge accumulated in an integration capacitor to a level of reference voltage. An integration operation is started as soon as the reset is completed.

The sensor SQ is a sensor that senses, like the sensor SL, the passing of the light beam and produces a conversion start signal for a signal converter (an A/D converter or a window comparator) that converts an analog signal to a digital signal, as will be described later. In the case of the A/D converter, the conversion start signal is used as an A/D conversion start signal. In the case of the window comparator, the conversion start signal is used as a timing signal for retaining a comparator output.

The pair of sensors SP and SO are a pair of patterns for detecting a passage position of the light beam. Each of the pattern of the sensor SP and the pattern of the sensor SO comprises a plurality of triangular or trapezoidal pattern portions. The sensor SP and sensor SO with the triangular/trapezoidal pattern portions are arranged such that their mutually associated triangular/trapezoidal pattern portions are paired. For example, the sensors SP and SO have sawtooth shapes and are arranged with a predetermined distance such that they mesh with each other.

In the example shown in FIG. 4, a plurality of triangular/trapezoidal patterns that form the sensor SP are referred to as sensor patterns SP1 to SP5. A plurality of triangular/trapezoidal patterns that form the sensor SO are referred to as sensor patterns SO1 to SO5. The sensor SP and sensor SO are arranged such that their sensor patterns SP1 to SP5 and sensor patterns SO1 to SO5 are paired.

As is shown in FIG. 4, the sensor pattern SP1 has such a shape that a distance, by which the light beam traverses (passes) across the sensor pattern SP1, may increase as the light beam passage position moves upward in FIG. 4. On the other hand, the sensor pattern SO1 has such a shape that a distance, by which the light beam traverses (passes) across the sensor pattern SO1, may increase as the light beam passage position moves downward in FIG. 4.

In other words, as the beam passage position varies in a direction (sub-scan direction) perpendicular to the scan direction (main-scan direction) of the light beam, an output from one sensor pattern SP1 (or SO1) gradually increases while an output from the other sensor pattern SO1 (or SP1) gradually decreases.

The sensors SP and SO comprise photodetector elements such as photodiodes and are constructed as one piece on the holder plate. As the light beam is passing (from the left to the right in FIG. 4), it is detected in succession by the sensor patterns SP1, SO1, SP2, SO2, SP3, SO3, SP4, SO4, SP5 and SO5. The sensor SP and sensor SO produce corresponding detection outputs.

FIG. 5 is a block diagram showing a main part (sub-scan-directional beam position detection section) of the light beam detection section output processing circuit 40 in a case where the light beam detection section 38 shown in FIG. 4 is used.

As is shown in FIG. 5, the main part of the light beam detection section output processing circuit 40 computes a difference between detection outputs from the sensor SP and sensor SO. In addition, in the light beam detection section output processing circuit 40, an integrator 62 integrates the difference between the detection outputs from the sensor SP and sensor SO. An integration result (integration output) obtained by the integrator 62 is supplied to the main control section (CPU) 51 via window comparators CMP1 and CMP2, etc.

The main part of the light beam detection section output processing circuit 40 will now be described in detail. In the description below, it is assumed that a single light beam is detected.

The sensor SP and sensor SO output currents in accordance with the passing of the light beam. The sensor SP and sensor SO are connected to current/voltage conversion amplifiers IV1 and IV2, respectively. The output currents from the sensors SP and SO are converted to voltage outputs.

Output terminals of the current/voltage conversion amplifiers (IV1 and IV2) are connected to a differential amplifier 61. The differential amplifier 61 amplifies the difference between the outputs from the current/voltage conversion amplifiers (IV1 and IV2) with a proper gain. The amplified output from the differential amplifier 61 is integrated by the integrator 62.

In the integrator 62, a charge is accumulated in an integration capacitor. Since the integrator 62 outputs the accumulated charge as an integration output, it is necessary that the accumulated charge in the integration capacitor be discharged before the use of the integrator 62 (hereinafter this operation being referred to as "integration reset operation").

The integration reset operation is executed by a reset signal produced from a combination of outputs of the sensors of the light beam detection section. The reset signal is generated by a reset signal generating circuit 63 on the basis of outputs from a sensor SA (not shown) and the sensor SL.

To be more specific, the sensors SA and SL produce output signals as the light beam is passing, and the integrator 62 is reset while the beam is passing between the sensors SA and SL. Immediately after the reset, the sensor patterns SP and SO produce output signals, and then the output signals are integrated.

An output signal from the integrator 62 is input to the window comparators (CMP1, CMP2). The window comparators (CMP1, CMP2) compare the output signal (analog voltage) of the integrator 62 with threshold voltage values provided by the main control section (CPU) 51.

Comparison results of the window comparators (CMP1, CMP2) are input to flip-flop circuits (F/F1, F/F2) and retained therein. In addition, a pulse signal output from the sensor pattern SQ is also input to the flip-flop circuits (F/F1, F/F2). The flip-flop circuits (F/F1, F/F2) retain the outputs from the window comparators (CMP1, CMP2) at the output timing of the sensor pattern SQ (i.e. at the rising edge of the pulse signal).

Outputs from the flip-flop circuits (F/F1, F/F2) are sent to the main control section 51. The main control section 51 receives, as an interrupt signal, an output signal from a timing sensor SR (not shown) provided on the light beam detection section 38. Thereby, each time the timing sensor SR produces the output signal (i.e. each time the main control section 51 receives the interrupt signal), the main control section 51 reads the data from the flip-flop circuits (F/F1, F/F2).

The operations of the window comparators (CMP1, CMP2) will now be described in detail.

As is shown in FIG. 5, the output of the integrator 62 is delivered to an inversion input terminal of the comparator CMP1 and a non-inversion input terminal of the comparator CMP2. A non-inversion input terminal of the comparator CMP1 is connected to the main control section 51 via a D/A converter (D/A1). An inversion input terminal of the comparator CMP2 is connected to the main control section 51 via a D/A converter (D/A2).

The main control section 51 delivers a threshold Vth1 to the non-inversion input terminal of the window comparator CMP1 via the D/A converter (D/A1). In addition, the main control section 51 delivers a threshold Vth2 to the inversion input terminal of the window comparator CMP2 via the D/A converter (D/A2). Assume that threshold Vth1>threshold Vth2.

Both comparators CMP1 and CMP2 output "1" only when the output voltage of the integrator 62 is less than the threshold Vth1 and greater than the threshold Vth2. When the outputs of the window comparators CMP1 and CMP2, that is, the outputs of the flip-flop circuits (F/F1, F/F2), are "1, 1", the main control section 51 determines that the output of the integrator 62 is present within the range (window) between the thresholds Vth1 and Vth2. The main control section 51 gradually narrows the width of the window and alters the beam position, thereby exactly determining the output voltage of the integrator 62, that is, the light beam passage position information. Based on the obtained light beam passage position information, the main control section 51 controls the passage position of the light beam.

Although depiction is omitted in FIG. 5, there are provided, in fact, signal processing circuits such as current/voltage conversion amplifiers for converting output currents of sensors SO and SP to voltage values and digitizing circuits for digitizing outputs from the current/voltage conversion amplifiers.

Processing operations in the case where the light beam passes over the light beam detection section 38 shown in FIG. 4 will now be described with reference to FIG. 5.

The light beam is scanned by the polygon mirror 35 in a direction of an arrow in FIG. 4. The sensors SL, SP, SO and SQ produce electric currents as the light beam passes over them. An output from the sensor SL is converted to a voltage value by a current/voltage conversion amplifier (not shown), and the voltage value is digitized by a digitizing circuit (not shown). The digitized signal is input to the reset signal generating circuit 63. The reset signal generating circuit 63 combines the digitized signal and the output signal from the sensor SA (not shown), thereby generating a reset signal. The reset signal is supplied to the integrator 62, thus resetting the integrator 62. This reset signal also serves as clear signals for the flip-flop circuits F/F1 and F/F2 and clears the flip-flop circuits F/F1 and F/F2.

When the light beam passes over the sensors SP and SO, the sensors SP and SO produce pulse currents corresponding to the position where the light beam scans. These output currents are converted to voltage value signals by the current/voltage conversion amplifiers (IV1, IV2). A difference between the voltage value signals is amplified by the differential amplifier 61 and the amplified difference is integrated by the integrator 62. The output from the integrator 62 is input to the comparators CMP1 and CMP2 functioning as analog/digital converters. The comparators CMP1 and CMP2 compare the output from the integrator 62 with thresholds set by the D/A converters (D/A1, D/A2) and produce digital signals.

Further, when the light beam passes over the sensor SQ, the sensor SQ produces an output current. The output current from the sensor SQ is converted to a voltage value by a current/voltage conversion amplifier (not shown), and the voltage value is digitized by a digitizing circuit. The digitized signal is input to the flip-flop circuits F/F1 and F/F2. The outputs from the window comparators CMP1 and CMP2 are retained by the flip-flop circuits F/F1 and F/F2 at the leading edge of the digitized signal.

A signal from the sensor SR (not shown) is input as an interrupt signal to the main control section 51. Upon receiving this signal, the main control section 51 reads in the outputs from the window comparators CMP1 and CMP2, i.e. the outputs from the flip-flop circuits F/F1 and F/F2.

A description will now be given of the case where the light beam passage position is P2.

Figure 6:
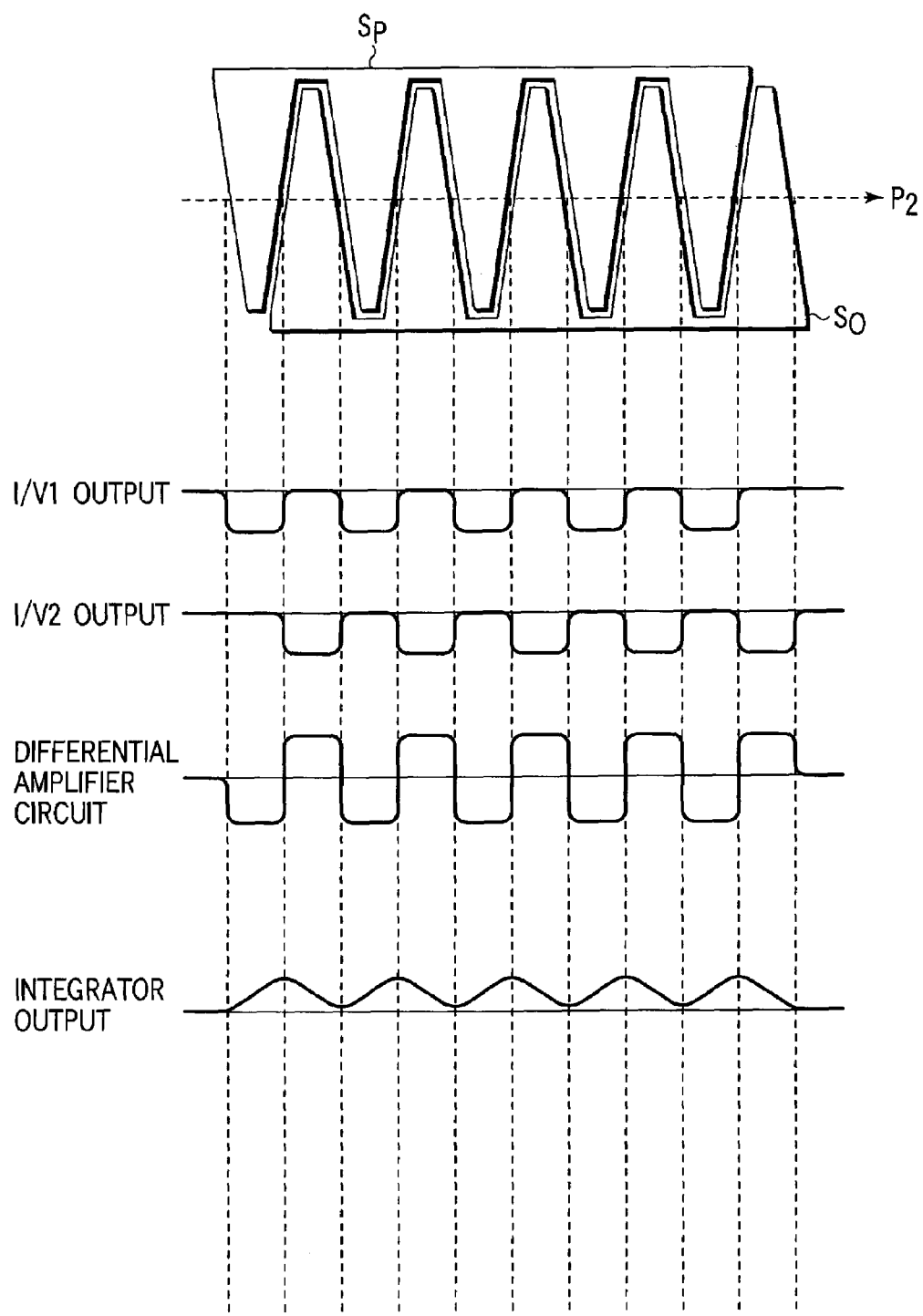
FIG. 6 shows examples of outputs of sensors corresponding to light beam passage positions, an output from a differential amplifier, and an output from an integrator.

FIG. 6 shows signals at respective parts of the processing circuit in the case where the light beam passes over a substantially central position (P2) of the sensors SP and SO in the sub-scan direction.

As is shown in FIG. 6, the beam passage position is P2 that is a substantially central position of the sensors SP and SO. Thus, the distance, by which the light beam passes over the sensor patterns SP1 to SP5 of the sensor SP, is equal to the distance by which the light beam passes over the sensor patterns SO1 to SO5 of the sensor SO. Accordingly, the current/voltage conversion amplifiers I/V1 and I/V2 produce out-of-phase signals with substantially equal pulse widths.

A difference between the outputs from the current/voltage conversion amplifiers I/V1 and I/V2 is calculated by the differential amplifier and amplified with a predetermined gain. The output from the differential amplifier 61 is integrated by the integrator 62. The output from the differential amplifier 61 is integrated in the following combinations:

(SP1 & SO1), (SP2 & SO2), (SP3 & SO3), (SP4 & SO4), and (SP5 & SO5). Thereby, the output signal from the integrator 62 becomes finally equal to a reference voltage (Vref) of the processing circuit.

In short, in the case where the light beam passage position is P2, the differential amplifier 61 produces opposite-directional signals with equal amplitudes, and the integration result becomes ±0 with respect to the reference voltage.

Figure 7:
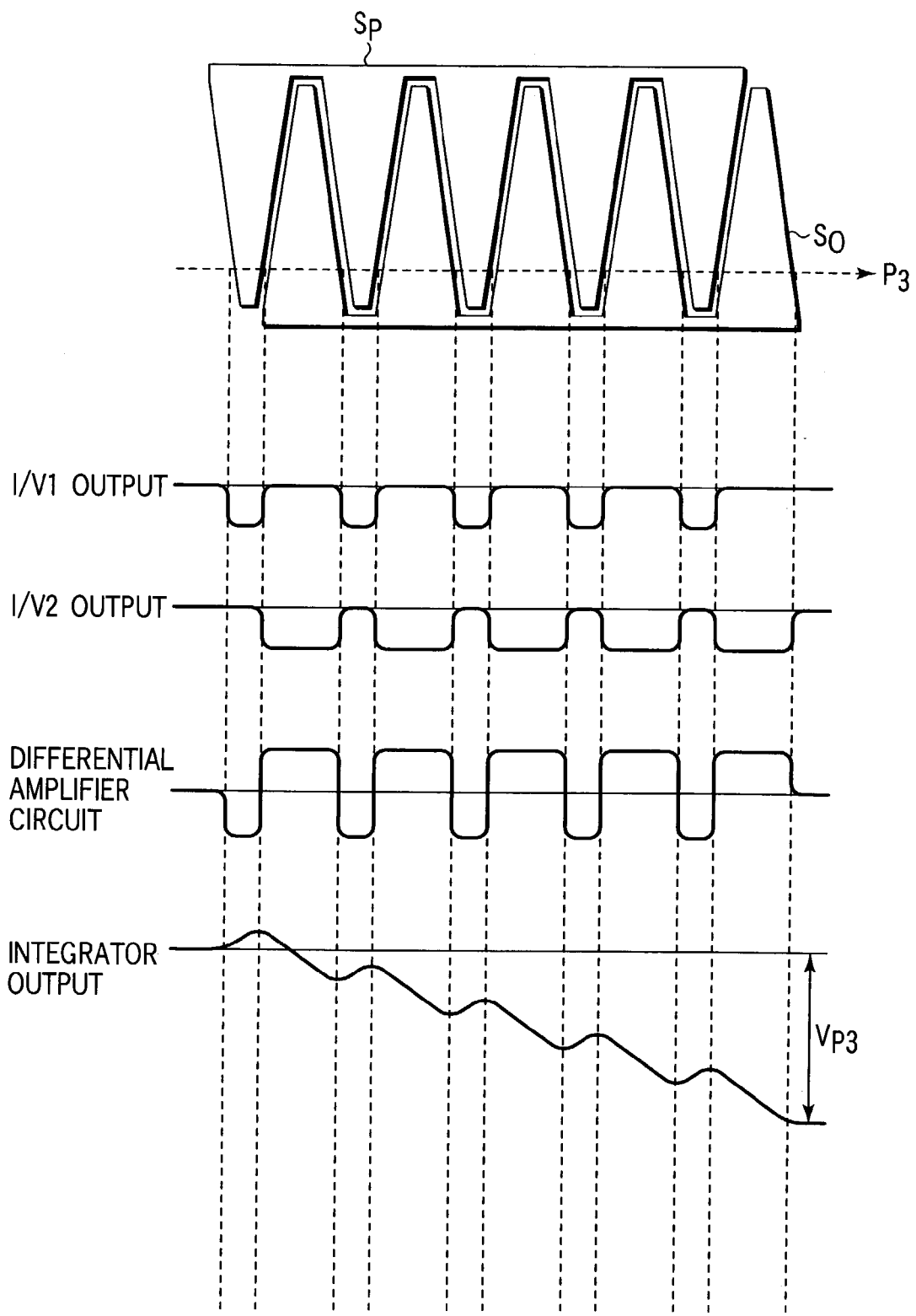
FIG. 7 shows examples of outputs of the sensors corresponding to light beam passage positions, an output from the differential amplifier, and an output from the integrator.

FIG. 7 shows signals at respective parts of the processing circuit in the case where the light beam passes over a position P3 lower than the center position P2 of the sensors SP and SO.

As is shown in FIG. 7, the beam passage position is P3 that is lower than the substantially central position P2 of the sensors SP and SO. Thus, the distance, by which the light beam passes over the sensor patterns SO1 to SO5 of the sensor SO, is greater than the distance by which the light beam passes over the sensor patterns SP1 to SP5 of the sensor SP.

Accordingly, a signal produced from the current/voltage conversion amplifier I/V2 has a greater pulse width than a signal produced from the current/voltage conversion amplifier I/V1. Hence, the output from the differential amplifier 61 has a waveform as shown in FIG. 7. Like the case of FIG. 6, the output from the differential amplifier 61 is integrated by the integrator 62 in the following pairs: (SP1 & SO1), (SP2 & SO2), (SP3 & SO3), (SP4 & SO4), and (SP5 & SO5). Thus, the output signal from the integrator 62 repeats increasing and decreasing in accordance with the output of the differential amplifier 61, and finally becomes −VP3 on the lower side of the reference voltage Vref.

Besides, in the case where the light beam passage position is P1 that is higher than the center position P2, an integration result, which is reverse to the case of the lower position P3 illustrated in FIG. 7, is obtained. Specifically, when the beam passage position is the higher position P1, the output signal from the integrator 62 finally becomes +VP3 on the upper side of the reference voltage Vref.

The processing circuit 40 outputs the reference voltage Vref when the light beam passage position is the center position P2 of the sensor SP and sensor SO. The processing circuit 40 outputs a voltage value higher than the reference voltage Vref when the light beam passage position is the position P1 higher than the center position P2. The processing circuit 40 outputs a voltage value lower than the reference voltage Vref when the light beam passage position is the position P3 lower than the center position P2.

As has been described above, the light beam passage position can be detected by integrating the difference signal representative of the output difference between the sensor SP and sensor SO.

Figure 8:
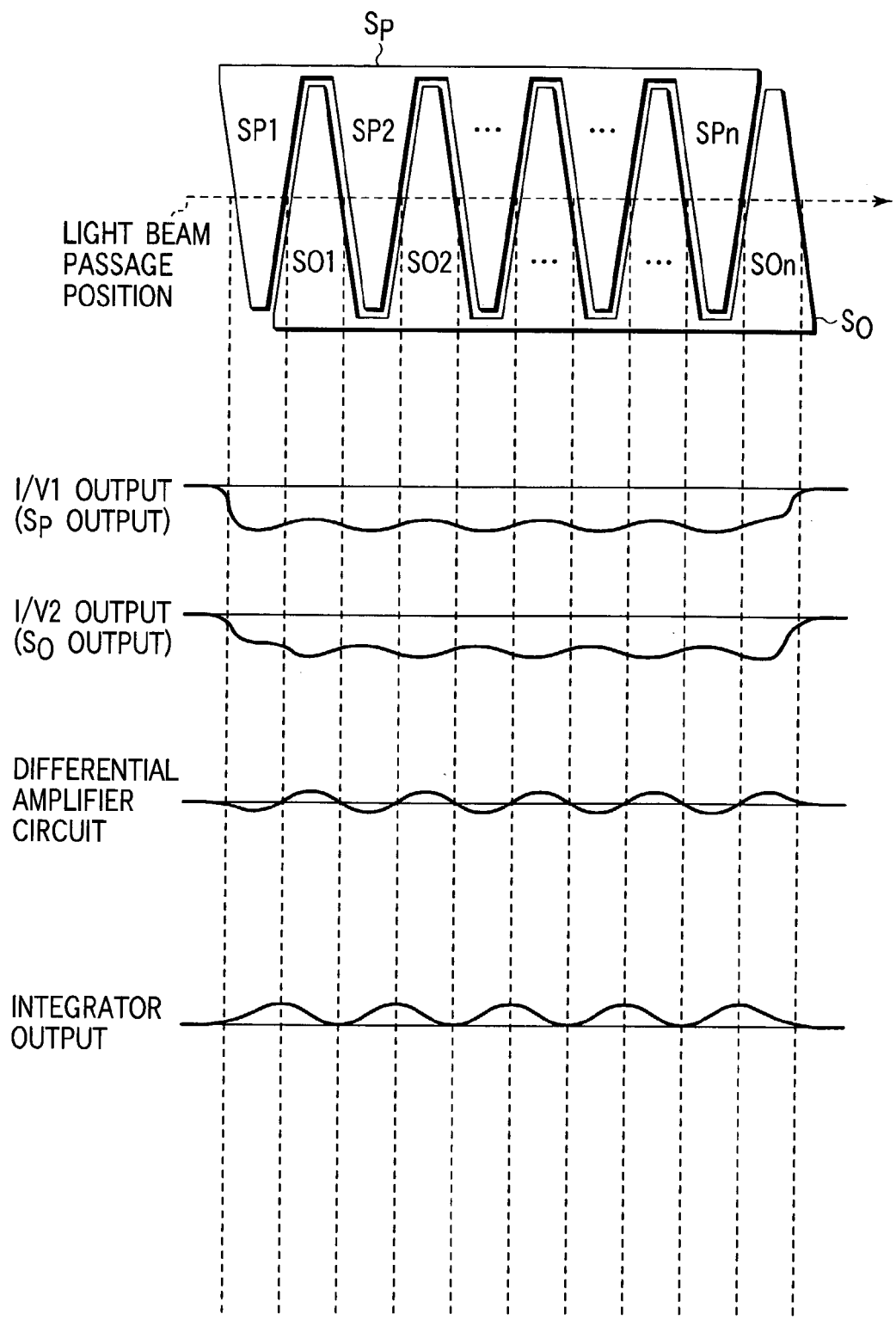
FIG. 8 shows examples of outputs of the sensors corresponding to light beam passage positions, an output from the differential amplifier, and an output from the integrator.
Figure 9:
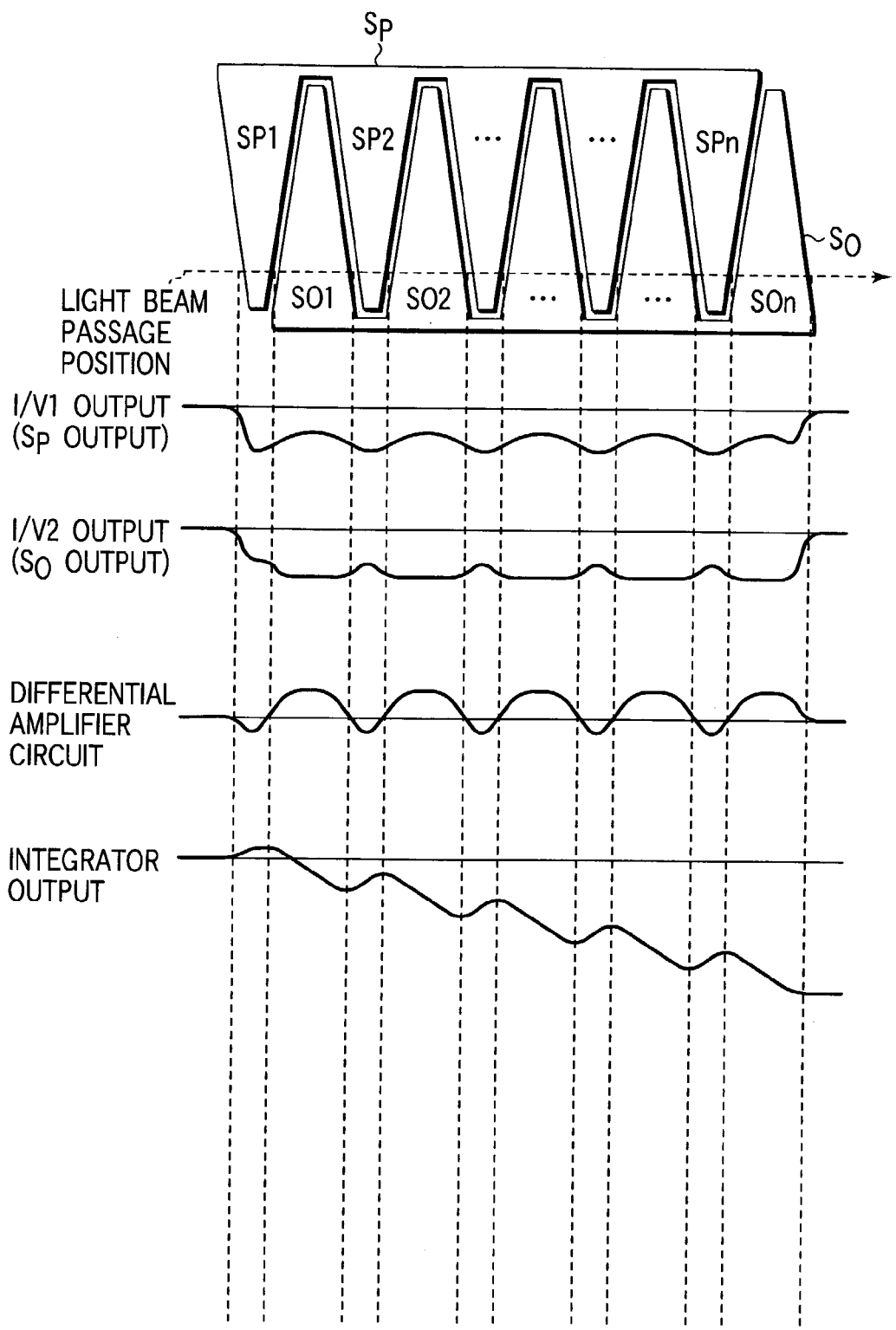
FIG. 9 shows examples of outputs of the sensors corresponding to light beam passage positions, an output from the differential amplifier, and an output from the integrator.

FIGS. 8 and 9 show examples of the case where the sawtooth-shaped sensor pattern of each of the sensors SP and SO is sufficiently smaller than the diameter of the light beam. When the light beam passage position is the center position P2, as shown in FIG. 8, the light beam detection section output processing circuit 40 outputs the reference voltage Vref, like the case of FIG. 6. When the light beam passage position is the position P3 that is lower than the center position P2, as shown in FIG. 9, the light beam detection section output processing circuit 40 outputs a voltage value lower than the reference voltage Vref, like the case of FIG. 7.

The operations of the light beam detection section output processing circuit 40 in the cases of FIGS. 8 and 9 are the same as those in the cases of FIGS. 6 and 7. Thus, a detailed description thereof is omitted.

Figure 10:
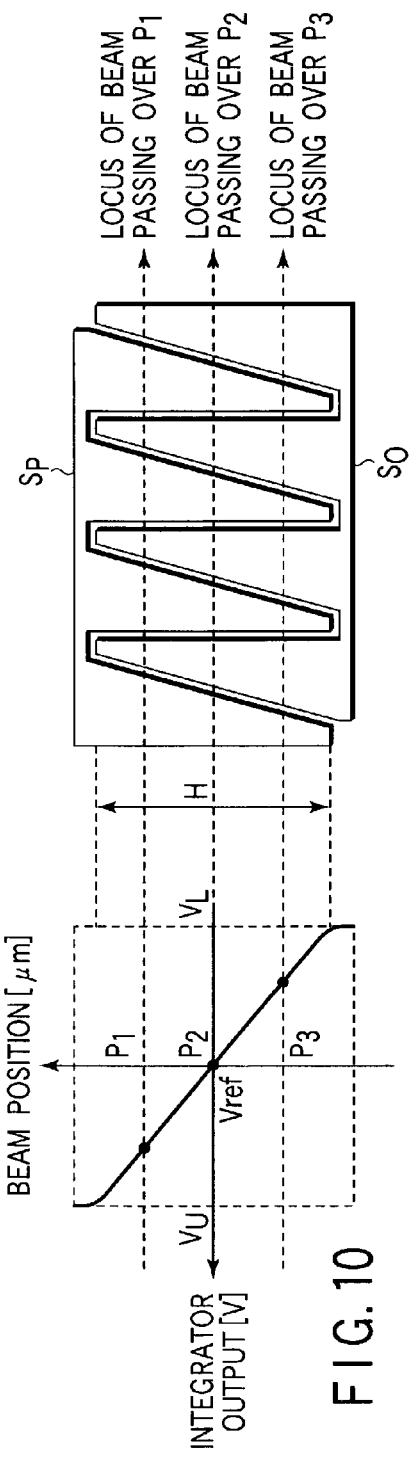
FIG. 10 shows a relationship between light beam passage positions and integration outputs.

FIG. 10 shows the relationship between the scan positions of the light beam over the sensor SP and sensor SO, on the one hand, and the output values of the integrator 62. As is shown in FIG. 10, as the beam scan position deviates from the center on the sensors SP and SO, the output of the integrator 62 deviates from the reference voltage Vref. In short, by comparing the output of the integrator 62 with the reference voltage Vref, it is possible to determine how the beam scan position deviates from the center.

A second operational example of the light beam scanning apparatus will now be described.

The second operational example relates to a light beam scanning apparatus having a multi-beam optical system that performs scanning by using a plurality (e.g. four) of light beams. The principle of the passage position detection and control for each light beam is the same as in the first operational example, so a description thereof is omitted here.

The multi-beam passage position control using the light beam detection section 38 shown in FIG. 4 will be described. Assume that the multi-beam optical system is a four-beam optical system having four laser oscillators and four actuators (galvano-mirrors in this example) for moving the light beams in the sub-scan direction. Further, assume that the multi-beam optical system has a resolution of, e.g. 600 dpi.

As has been described in connection with the first operational example, the light beam detection section 38 has detection characteristics as shown in FIG. 10. The integration output is about |VU−VL|/H=V unit [V/µm]. Thus, in order to adjust the pitch of the four beams at a resolution of 600 dpi, the galvano-mirrors may be adjusted so that the difference between the integration outputs of adjacent beams may become about V unit×42.3 [V].

For example, when a passage target position of the first light beam is set at P2, the first laser oscillator is activated to emit the first light beam, and the polygon mirror is rotated. The galvano-mirror for the first light beam is operated so that the first light beam may pass over an area within the sensor patterns. If the first light beam is successfully made to pass over the area within the sensor patterns, the galvano-mirror is further operated so that the integration output may become Vref. Thus, the passage position of the first light beam is adjusted.

Next, the passage position of the second light beam is adjusted. The second laser oscillator is activated to emit the second light beam, and the polygon mirror is rotated. Like the case of the first light beam, the galvano-mirror for the second light beam is operated so that the second light beam may pass over the area within the sensor patterns. Then, the galvano-mirror is further operated so that the integration output may become Vref−V unit×42.3 [V]. Thus, the passage position of the second light beam is adjusted.

With the above operations, the pitch of the passage positions of the first and second light beams is controlled and set at 42.3 [µm]. Similarly, as regards the third and fourth light beams, the associated galvano-mirrors are so adjusted that the difference between integration outputs of the adjacent light beams may become V unit×42.3 [V] corresponding to 42.3 [µm].

According to the above operation, the passage positions of the four light beams are controlled to have predetermined intervals, e.g. a pitch of 42.3 [µm]. A third operational example of the light beam scanning apparatus will now be described.

The third operational example, like the second operational example, relates to a light beam scanning apparatus having a multi-beam optical system. In the third operational example, at least one of a plurality of light beams is fixed, and the passage positions of the other light beams are controlled with a predetermined pitch with reference to the passage position of the fixed light beam (relative position control).

Figure 11:
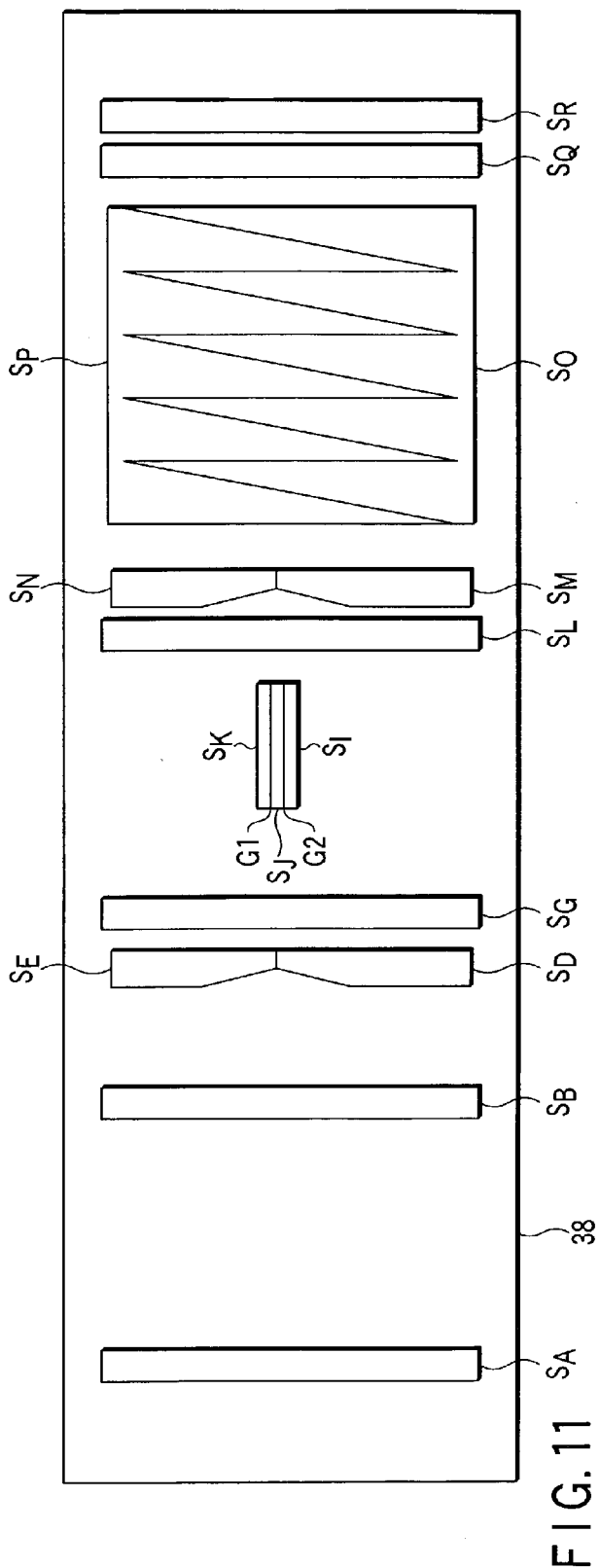
FIG. 11 schematically shows an example of the structure of the light beam detection section.

FIG. 11 shows an example of the structure of the light beam detection section 38. The light beam detection section 38 includes sensors SA, SB, SG, SL, SQ and SR elongated in a direction perpendicular to the scan direction of the light beams; sensors SI, SJ and SK elongated in the scan direction of the light beams; and sensors SP and SO constructed like the sensor patterns described in connection with the first and second operational examples. These sensors are formed on a holder plate 38a.

In FIG. 11, outputs from the two sensors SA and SL are used to produce a reset signal for the integrator 62. In addition, in FIG. 11, an output signal from the sensor SQ is used to produce a conversion start timing signal for converting the integration output from an analog signal to a digital signal, and an output signal from the sensor SR is used to produce a read-in timing signal indicative of read-in timing of the main control section 51.

On the other hand, the sensors SI, SJ and SK are sensors for adjusting the intervals of the light beams in the sub-scan direction. The sensors SI, SJ and SK are provided on a substantially central area on the holder plate 38a in the sub-scan direction. These sensors are arranged in parallel with a pitch (resolution: 600 dpi) of 42.3 [μm] in the sub-scan direction. A sub-scan-directional position of a gap G1 between the sensors SJ and SK is a first passage target position. The sensors SJ and SK are used to confirm the state in which the light beam is passing over the first passage target position. A sub-scan-directional position of a gap G2 between the sensors SI and SJ is a second passage target position. The sensors SI and SJ are used to confirm the state in which the light beam is passing over the second passage target position.

A pair of sensors SD and SE and a pair of sensors SM and SN are sensors for detecting an inclination of the scanned light beam relative to the light beam detection section 38. The paired sensors SD an SE and the paired sensors SM and SN are vertically arranged. The center of the paired sensors SD and SE is aligned with the center of the paired sensors SM and SN.

The light beam detection section 38 also includes a timing sensor SS for generating a correction pulse.

Figure 12:
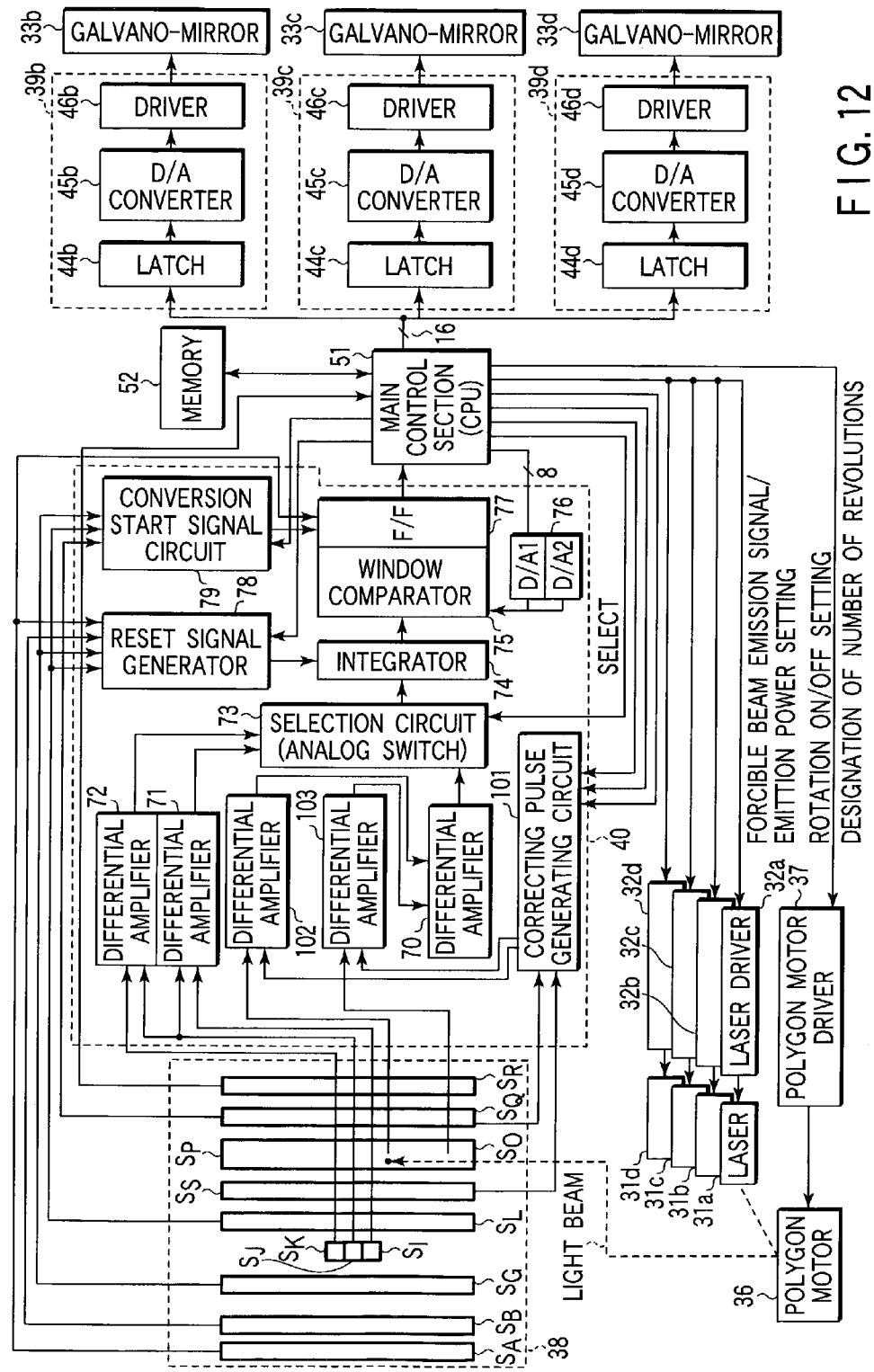
FIG. 12 is a block diagram schematically showing an example of the structure of the control system of the optical system.

FIG. 12 shows the structure of the light beam detection section output processing circuit 40 in the case of using the light beam detection section 38 shown in FIG. 11, and the structure of peripheral components of the light beam detection section output processing circuit 40 shown in FIGS. 2 and 3.

Output signals from the sensors SO and SP are delivered to input terminals of a differential amplifier 70. Output signals from the sensors SI and SJ are delivered to input terminals of a differential amplifier 71. Output signals from the sensors SJ and SK are delivered to input terminals of a differential amplifier 72. The main control section (CPU) 51 can set amplification factors for the differential amplifiers 70, 71 and 72.

Output signals from the differential amplifiers 70, 71 and 72 are supplied to a select circuit (analog switch) 73. Upon receiving a sensor select signal from the main control section 51, the select circuit 73 selects one of the output signals from the differential amplifiers 70, 71 and 72, which is to be input to the integrator 74. The signal selected by the select circuit 73 is input to, and integrated by, the integrator 74.

An output signal from the integrator 74 is input to a window comparator 75. The window comparator 75 converts an integration output (analog signal) from the integrator 74 to a digital signal. Thresholds for the window comparator 75 are set by the main control section 51 via a D/A converter 76. The D/A converter 76 comprises two D/A converters (D/A1, D/A2).

An output from the window comparator 75 is sent to a flip-flop circuit (F/F) 77. The flip-flop circuit (F/F) 77 retains the output from the window comparator 75. An output from the flip-flop circuit 77 is sent to the main control section 51.

An output signal from the sensor SA is sent as a clear signal to the flip-flop circuit 77. Output signals from the sensors SA, SG and SL are sent to a reset signal generating circuit 78. In response to a select signal from the main control section 51, the reset signal generating circuit 78 generates a reset signal on the basis of the output signals from the sensors SA, SG and SL. The reset signal resets the integrator 74. After reset by the reset signal, the integrator 74 starts an integration operation.

Output signals from the sensors SL and SQ are sent to a conversion start signal circuit 79. In response to a select signal from the main control section 51, the conversion start signal circuit 79 selects one of the output signals from the sensors SL and SQ. The selected signal is sent to the flip-flop circuit 77 as a conversion start signal. An output signal from the sensor SR is sent to the main control section 51 as an interrupt signal.

Upon receiving the interrupt signal from the sensor SR, the main control section 51 reads in the output from the flip-flop circuit 77, thereby acquiring latest beam passage position information. Based on the acquired beam passage position information, the main control section 51 computes control amounts for the galvano-mirrors 33b, 33c and 33d. The main control section 51 stores, where necessary, computation results in a memory 52 and send them to galvano-mirror drive circuits 39b, 39c and 39d.

The galvano-mirror drive circuits 39b, 39c and 39d include latches 44b, 44c and 44d. Once the main control section 51 writes data in the latch, 44b, 44c, 44d, the latch keeps the data until it is updated.

The data retained in the latches 44b, 44c and 44d is converted to analog signals (voltages) by D/A converters 45b, 45c and 45d, and the analog signals are input to drivers 46b, 46c and 46d for driving the galvano-mirrors 33b, 33c and 33d. The drivers 46b, 46c and 46d drive and control the galvano-mirrors 33b, 33c and 33d in accordance with the analog signals (voltages) input from the D/A converters 45b, 45c and 45d.

According to the third operational example, the semiconductor laser oscillators, which generate light beams to be controlled, are activated. The output from the window comparator 75 is read in, and the galvano-mirrors 33b, 33c and 33d are controlled on the basis of the read-in information. Thus, the light beam passage positions can be controlled.

Although depiction is omitted in FIG. 12, there are provided, in fact, signal processing circuits such as current/voltage conversion amplifiers for converting output currents of the respective sensors to voltage values and digitizing circuits for digitizing outputs from the current/voltage conversion amplifiers.

In the structure shown in FIG. 12, when the light beam passage position detection and control are performed using the sensors SP and SO, the main control section 51 sends the select signal for selecting the differential amplifier 70 to the select circuit 73. Thereby, the main control section 51 selects the sensors SP and SO.

Similarly, the main control section 51 sends sensor select signals to the reset signal generating circuit 78 and conversion start signal circuit 79. Thereby, the main control section 51 generates a reset signal for the integrator 74 and a digital/analog conversion start signal. In this case, the reset signal for the integrator 74 rises at the leading edge of the output from the sensor SA, and falls at the trailing edge of the output from the sensor SH. The conversion start signal is generated from the output signal of the sensor SL.

When the light beam passage position detection and control are performed using the sensors SI and SJ or the sensors SJ and SK, the main control section 51 sends to the select circuit 73 the select signal for selecting the differential amplifier 72 or differential amplifier 71. Thereby, the main control section 51 selects the pair of sensors SI and SJ or the pair of sensors SJ and SK.

Similarly, the main control section 51 sends sensor select signals to the reset signal generating circuit 78 and conversion start signal circuit 79. Thereby, the main control section 51 generates a reset signal for the integrator 74 and a digital/analog conversion start signal. In this case, the reset signal for the integrator 74 rises at the leading edge of the output from the sensor SA, and falls at the trailing edge of the output from the sensor SL. The conversion start signal is generated from the output signal of the sensor SQ.

Whichever sensor is selected, the main control section 51 reads in the integration output of the integrator 74, which is retained in the flip-flop circuit 77, at the timing of the output signal from the sensor SR.

As mentioned above, one of the four light beams is fixed, so the other three light beams are moved in the sub-scan direction by three galvano-mirrors. That is, three galvano-mirrors 33b, 33c and 33d are used for the second, third and fourth light beams.

In the circuitry depicted in FIG. 12, differential amplifiers 102 and 103 are provided at the front stage of the differential amplifier 70. Further, a timing sensor SS for generating a correction pulse and a correction pulse generating circuit 101 are provided.

In the circuit diagram of FIG. 12, the correction pulse generating sensor 101 is connected to the main control section 51, timing sensor SS and timing sensor SQ. The differential amplifiers 102 and 103 are connected to either the sensor pattern SO or sensor pattern SP.

In the circuitry of FIG. 12, to start with, the output of the integrator 74 based on the light beam position is input to the main control section 51. Based on the output of the integrator 74, the main control section 51 determines the necessity for correction. If the main control section 51 determines that the correction is necessary, it selects the sensor SO or SP associated with the correction and sets an instruction value that indicates a value of a correction pulse as a correction amount. In this case, the main control section 51 outputs to the correction pulse generating circuit 101 a control execution signal instructing execution of a correction control, a sensor select signal indicative of a sensor associated with the correction, and an instruction value that indicates a value of a correction pulse. In addition, the main control section 51 sends a control signal to the select circuit 73 to select the differential amplifier 70.

The correction pulse generating circuit 101 sets a correction pulse of a voltage value, which is instructed by the main control section 51, in the differential amplifier 102 (or 103) that is connected to the sensor SO (or SP) selected by the sensor select signal from the main control section 51. In this case, a correction pulse with a reference voltage is set in the differential amplifier 103 (or 102) connected to the sensor SP (or SO) that is not selected by the sensor select signal. The correction pulse is supplied to the differential amplifiers 102 and 103 at the timing at which the timing sensor SS senses the light beam.

Upon receiving the output signals from the sensors SO and SP, the differential amplifiers 102 and 103, which are supplied with the correction pulses, deliver differences between the correction pulses and the outputs from the sensors SO and SP. Thereby, the differential amplifier 70 receives the output signals of the sensors SO and SP, which have been corrected by the values set by the main control section 51.

Figure 13:
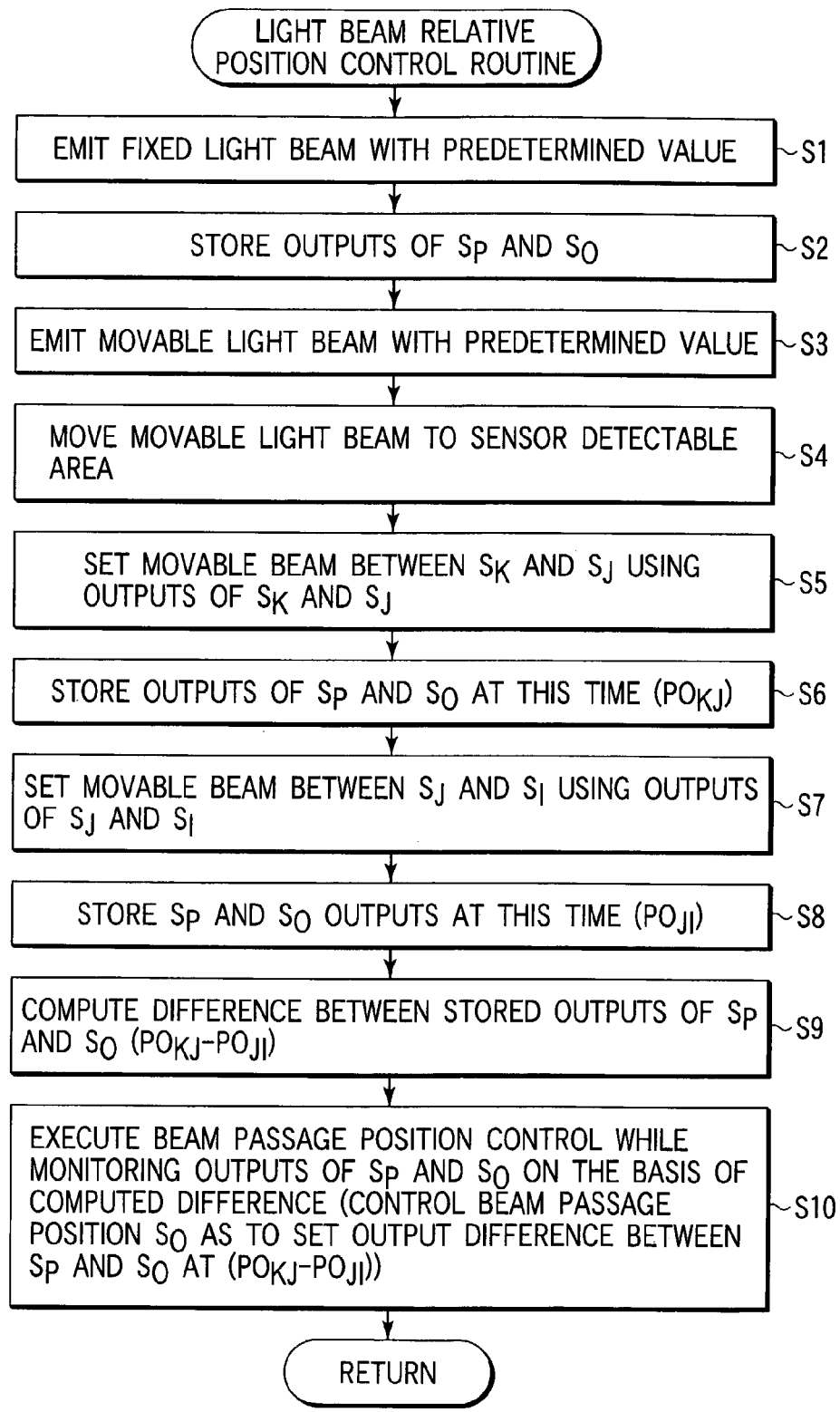
FIG. 13 is a flow chart illustrating a light beam relative position control operation.

Referring now to a flow chart of FIG. 13, the light beam relative position control of the multi-beam optical system according to the third operational example will be described. The flow chart of FIG. 13 illustrates the operation of the circuitry shown in FIG. 12.

To begin with, the main control section 51 activates the laser oscillator of a fixed light beam, thus producing a fixed light beam with a predetermined value (step S1). For example, the main control section 51 sends a predetermined instruction value to the first laser driver 32a, and causes the first laser oscillator 31a to emit a first light beam with a predetermined power. Thus, the main control section 51 produces the first light beam. Assume that the polygon mirror motor is already rotating at this time.

Then, the main control section 51 selects an instruction value as a correction value, and sends it to the correction pulse generating circuit 101.

At the same time, the main control section 51 sends to the select circuit 73 a select signal for selecting the differential amplifier 70. Thereby, the main control section 51 sends an output difference between the sensor pattern SP and sensor pattern SO to the integrator 74.

Similarly, the main control section 51 sends sensor select signals to the reset signal generating circuit 78 and conversion start signal circuit 79. Thereby, the main control section 51 generates a reset signal at the time of integrating the difference signal indicative of the output difference between the sensors SP and SO, and an analog/digital conversion start signal. In this step, the main control section 51 can read in the output difference between the sensors SP and SO.

The light beam detection section output processing circuit 40 outputs to the main control section 51 an output signal corresponding to the passage position of the fixed beam, which is detected by the light beam detection section 38 having the sensors SO and SP. The main control section 51 determines detection characteristics based on the correction value determined by the instruction value supplied to the light beam detection section output processing circuit 40. The main control section 51 detects the passage position of the fixed beam, on the basis of the determined detection characteristics corresponding to the instruction value and the output signal from the light beam detection section output processing circuit 40. The detected passage position of the fixed beam is recorded in the memory 52 by the main control section 51 (step S2).

In a step described below, the passage positions of the other three light beams are controlled to have a predetermined pitch (e.g. 42.3 µm) with reference to the passage position of the first light beam detected in step S2.

Subsequently, the main control section 51 produces a second light beam, which is movable, with a predetermined power (step S3). For example, the main control section 51 sends a predetermined instruction value to the second laser driver 32b, and causes the second laser oscillator 31b to emit a second light beam with a predetermined power.

The main control section 51 selects a proper instruction value, like the above case, and monitors the output difference between the sensors SP and SO on the basis of detection characteristics according to the instruction value. Thus, the main control section 51 can understand the passage position of the second light beam. The main control section 51 operates the galvano-mirror 33b so that the second light beam may pass over the sense area of the sensors SP and SO (step S4). Then, the main control section 51 operates the galvano-mirror 33b so that the second light beam may pass over a central area of the sensors SP and SO. Note that the adjustment of the light beam passage position in this step does not require a high precision.

Thereafter, the main control section 51 controls the second light beam, which has been roughly adjusted in step S4, so that the passage position of the second light beam may come to the center of the gap between the sensors SK and SJ (step S5). The sensors SI, SJ and SP are arranged at a substantially central position of the sensors SP and SO. Thus, the main control section 51 can control the passage position of the light beam at the center of the gap between the sensors SK and SJ without the need to greatly vary the passage position (and without requiring much time). The processing in step S5 will be described below in detail.

To start with, the main control section 51 sends a select signal for selecting the differential amplifier 71 to the select circuit 73. Thus, an output difference between the sensors SK and SJ is input to the integrator 74. Similarly, the main control section 51 sends sensor select signals to the reset signal generating circuit 78 and conversion start signal circuit 79. Thereby, the main control section 51 generates a reset signal at the time of integrating the difference signal indicative of the output difference between the sensors SK and SJ, and an analog/digital conversion start signal. In this step, the main control section 51 can read in the output difference between the sensors SK and SJ.

Subsequently, the main control section 51 operates the galvano-mirror 33b for the second light beam, thereby controlling and setting the passage position of the second light beam at the center of the gap between the sensors SK and SJ. In order to operate the galvano-mirror 33b, the main control section 51 sets an instruction value in the D/A converter 45b. An analog signal produced from the D/A converter 45b is input to the driver 46b. The driver 46b supplies the galvano-mirror 33b with a current corresponding to the D/A conversion value. The galvano-mirror 33b operates in accordance with the output current value of the driver 46b. Therefore, the main control section 51 can alter the passage position of the second light beam by varying the instruction value set in the D/A converter 45b.

Then, the main control section 51 reads in, once again, the output difference between the sensor SP and sensor SO, while retaining the setting of the galvano-mirror 33b in step 5. In this case, the main control section 51 selects nocorrection and detects the light beam position. The reason is that there is no need of correction since the sensors SI, SK and SJ are arranged at a substantially central position of the sensors SP and SO. If the passage position of the light beam is controlled and set at the center of the gap between the sensors SK and SJ by this position detection, the main control section 51 stores an output value (POKJ) of the processing circuit 40 at this time in the memory 52 (step S6). The value POKJ is the output value of the processing circuit 40 which indicates that the light beam passage position is at the center of the gap between the sensors SK and SJ.

Next, the main control section 51 effects a control to set the second light beam, which is controlled and set at the center of the gap between the sensors SK and SJ in step S6, at the center of the gap between the sensors SJ and SI (step S7).

To begin with, the main control section 51 sends a select signal for selecting the differential amplifier 72 to the select circuit 73. Thus, an output difference between the sensors SJ and SI is input to the integrator 74. Similarly, the main control section 51 sends sensor select signals to the reset signal generating circuit 78 and conversion start signal circuit 79. Thereby, the main control section 51 generates a reset signal at the time of integrating the difference signal indicative of the output difference between the sensors SJ and SI, and an analog/digital conversion start signal. In this step, the main control section 51 can read in the output difference between the sensors SJ and SI.

Then, like step S5, the main control section 51 operates the galvano-mirror 33b for the second light beam and controls the passage position of the second light beam at the center of the gap between the sensors SJ and SI.

While the second light beam is passing over the center of the gap between the sensors SJ and SI, the main control section 51 reads in, once again, the output difference between the sensors SP and SO. In this case, the main control section 51 selects no-correction as a D/A value and detects the light beam position. The reason is that there is no need of correction since the sensors SI, SK and SJ are arranged at a substantially central position of the sensors SP and SO. If the passage position of the light beam is controlled and set at the center of the gap between the sensors SJ and SI by this position detection, the main control section 51 stores an output value (POJI) of the processing circuit 40 at this time in the memory 52 (step S8). The value POJI is the output value of the processing circuit 40 which indicates that the light beam passage position is at the center of the gap between the sensors SJ and SI.

Subsequently, the main control section 51 computes a difference between the value POKJ stored in the memory 52 in step S6 and the value POJI stored in the memory 52 in step S8 (step S9). The pitch between the center position of the sensors SK and SJ and the center position of the sensors SJ and SI is 42.3 µm. Accordingly, the distance of the movement of the light beam from step S5 (step S6) to step S7 (step S8) is 42.3 µm. Therefore, the difference between POKJ and POJI computed in step S9 is equal to the output difference between the sensors SP and SO and corresponds to the distance (42.3 µm) of the movement of the second light beam.

In the third operational example, the light beam position is detected using detection characteristics corresponding to the instruction value set by the main control section 51. In order to set the relative distance between the first light beam and second light beam at a predetermined pitch (42.3 µm), it is necessary to control the position of the second light beam on the basis of the detection characteristics selected in step S2.

Specifically, the second beam position is controlled so that the output of the second light beam may become [(value stored in memory 52 in step 2)−(POKJ−POJI)] in the state in which the instruction value selected in step S2 is set. Thereby, the passage position of the fixed light beam (first light beam) and the passage position of the movable second light beam are controlled at a predetermined pitch (42.3 µm).

In the processing of this step, the output difference between the sensors SP and SO is used.

The passage position of the fixed first light beam is detected in step S2 and stored in the memory 52. The main control section 51 operates the galvano-mirror 33b and controls the second light beam passage position so that the movable second light beam passage position may have the pitch of 42.3 μm relative to the first light beam.

To begin with, the main control section 51 sets the same D/A value as in step S2 in the processing circuit 40, and generates the second light beam. The main control section 51 alters the second light beam passage position such that the output value of the processing circuit 40, which represents the second light beam passage position, may coincide with a value obtained by subtracting the value (POKJ−POJI) acquired in step S9 from the value stored in the memory 52 in step S2 (step S10).

According to the above-described operation, the passage positions of the first light beam and second light beam are set at the pitch of 42.3 μm. The same operation is performed for the third and fourth light beams, and thus each light beam is controlled at the pitch of 42.3 μm.

According to the above-described technique, the relative position detection of light beams is performed in the light beam scanning apparatus having the multi-beam optical system.

A first embodiment of the invention with the above-described structure will now be described.

Figure 14:
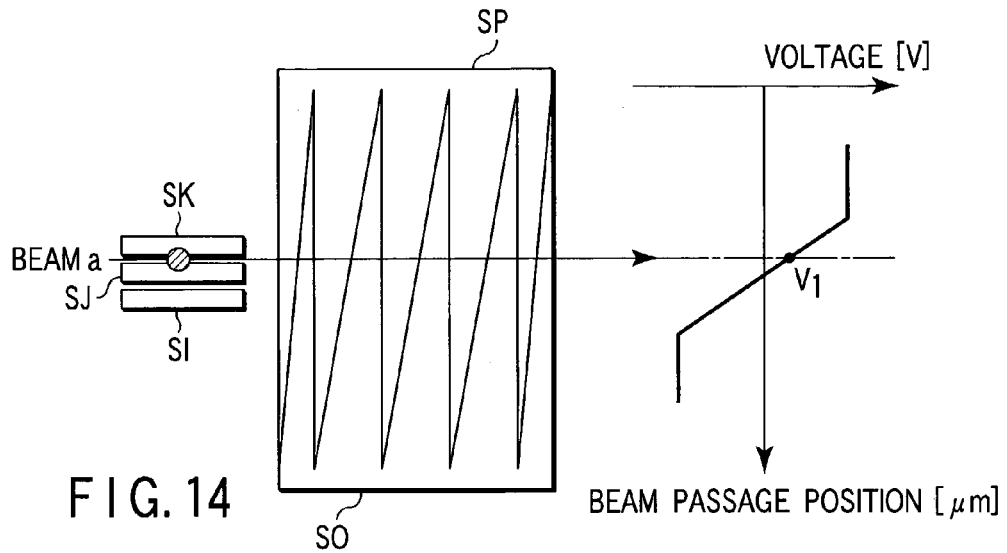
FIG. 14 shows a specific example of the relative position control.

FIG. 14 shows the sensors SI, SJ and SK with the reference pitch shown in FIG. 11, sensors SO and SP with relative positions, and sensor outputs with relative positions.

As mentioned in the description of the relative position detection control, the sensors SI, SJ and SK are used for the light beam passage position detection and control.

When the passage position of a light beam a is to be detected, the main control section 51 selects either a pair of sensors SK and SJ and a pair of sensors SJ and SI in connection with the three sensors SI, SJ and SK. An output current, which is produced when the light beam a scans the sensors, is I/V converted, and an output difference is obtained to detect the beam position.

In the relative position control, the passage position of the movable light beam a is controlled and set at the center of the gap between the sensors SK and SJ, as shown in FIG. 14. The output difference between the sensors SO and SP at this time is obtained, and an integration value (voltage V1) of the output difference is stored.

Figure 15:
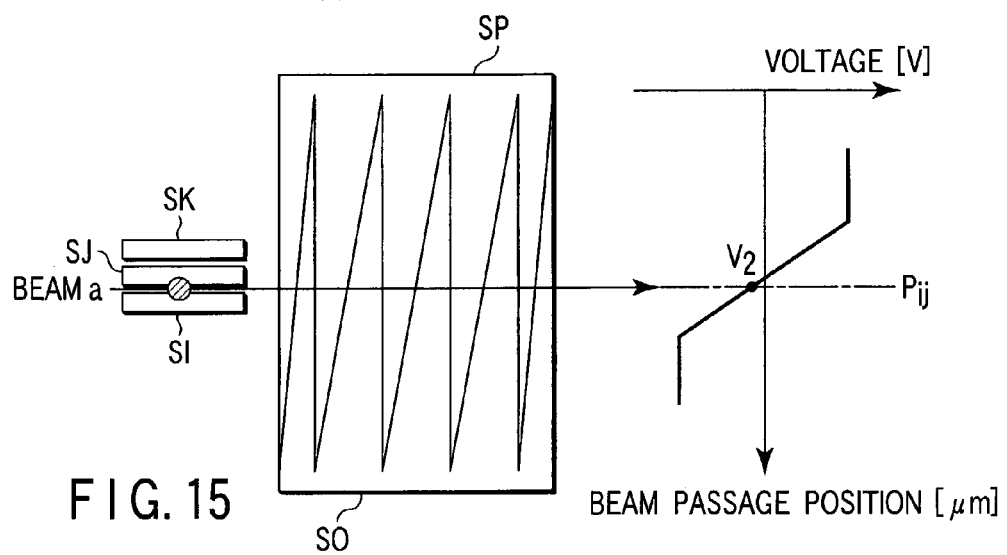
FIG. 15 shows a specific example of the relative position control.

Similarly, as shown in FIG. 15, the passage position of the movable light beam a is controlled and set at the center of the gap between the sensors SJ and SI. The output difference between the sensors SP and SO at this time is obtained, and an integration value (voltage V2) of the output difference is stored.

Figure 16:
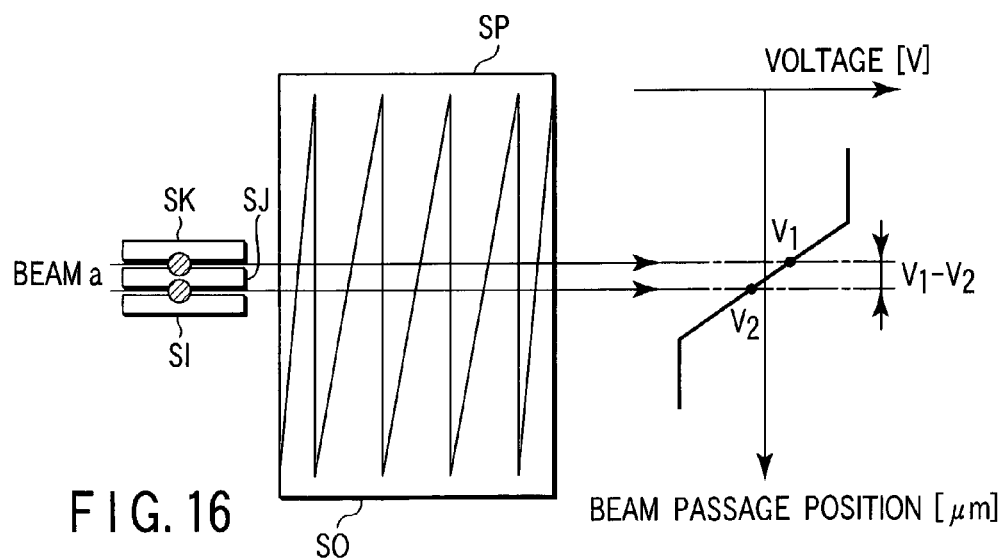
FIG. 16 shows a specific example of the relative position control.

As is shown in FIG. 16, a voltage of $V_1-V_2$ is obtained when the movable beam a is moved by a distance corresponding to, for example, a multiple of 42.3 μm for a resolution of 600 dpi, so that $V_1-V_2$ may correspond to a desired resolution.

Figure 17:
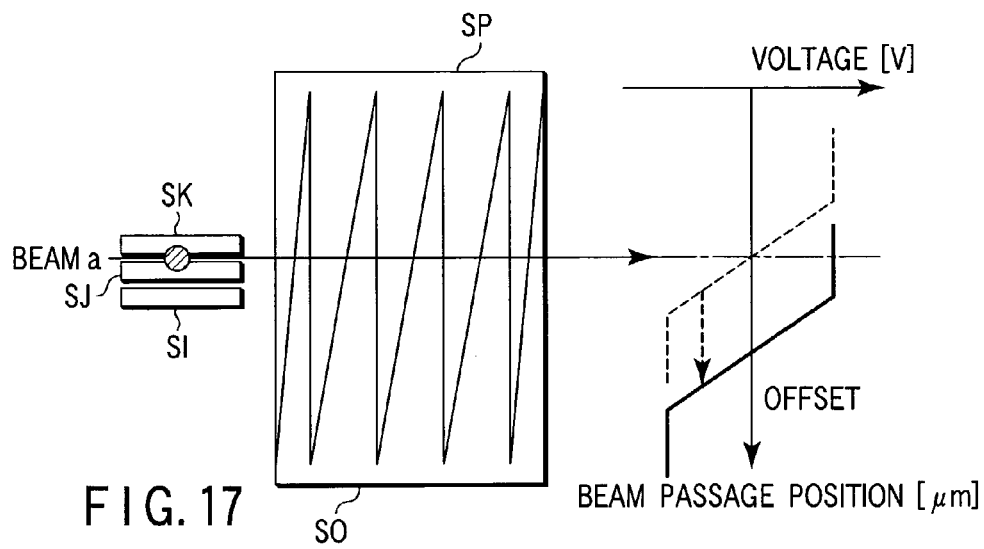
FIG. 17 shows a specific example of a correction process of the relative position control.
Figure 18:
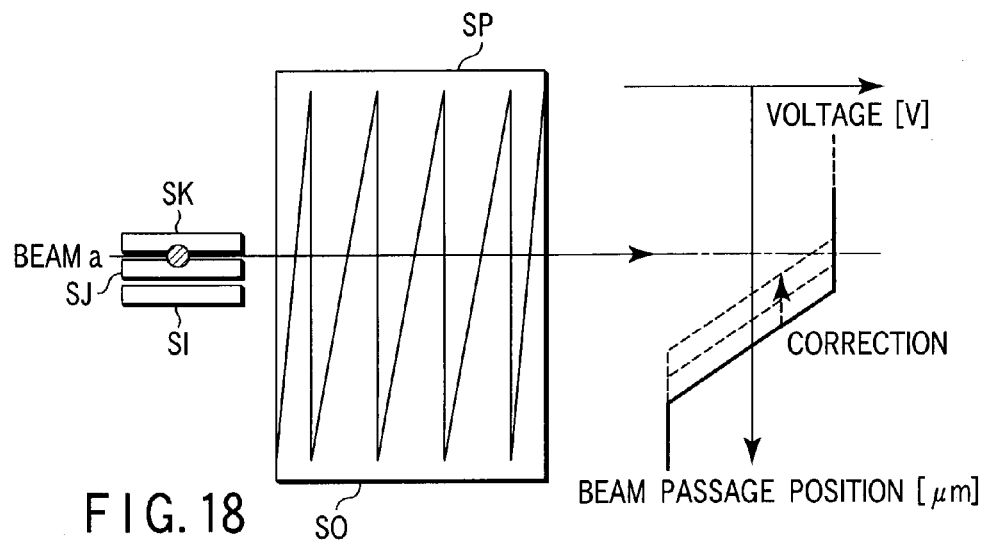
FIG. 18 shows a specific example of the correction process of the relative position control.

However, the circuitry required until the sensors SP and SO produce output signals is configured such that a plurality of operational amplifiers are provided and a difference between electric signals sensed by the sensors is integrated by the integrator. An operational amplifier has a factor of offset. In a case where there is an offset in the sensors SP and SO, as shown in FIG. 17, the range of measurement is narrowed to enhance sensitivity. Thus, as shown in FIG. 18, the measurement and control are performed after making a correction to shift the beam position to a measurable position.

Figure 19:
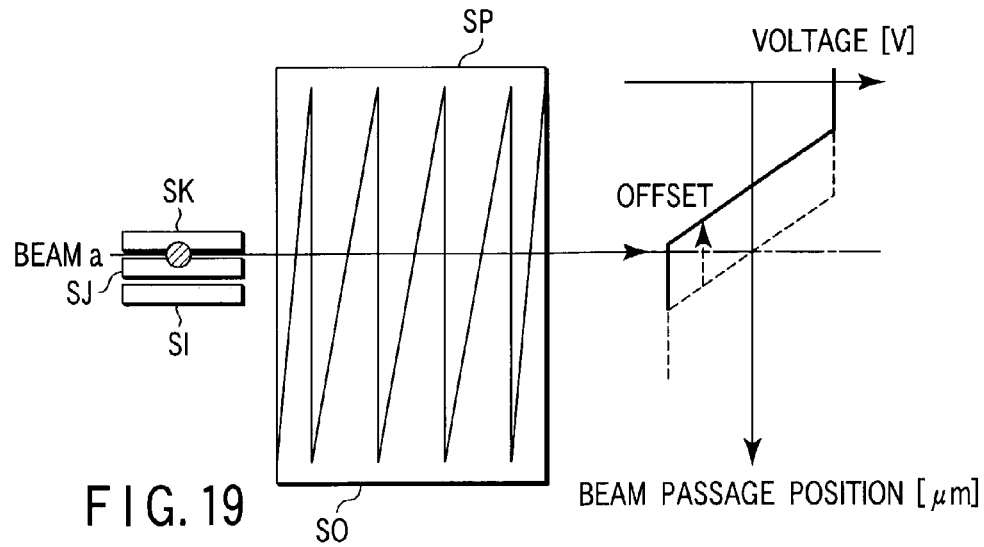
FIG. 19 shows a specific example of the correction process of the relative position control.
Figure 20:
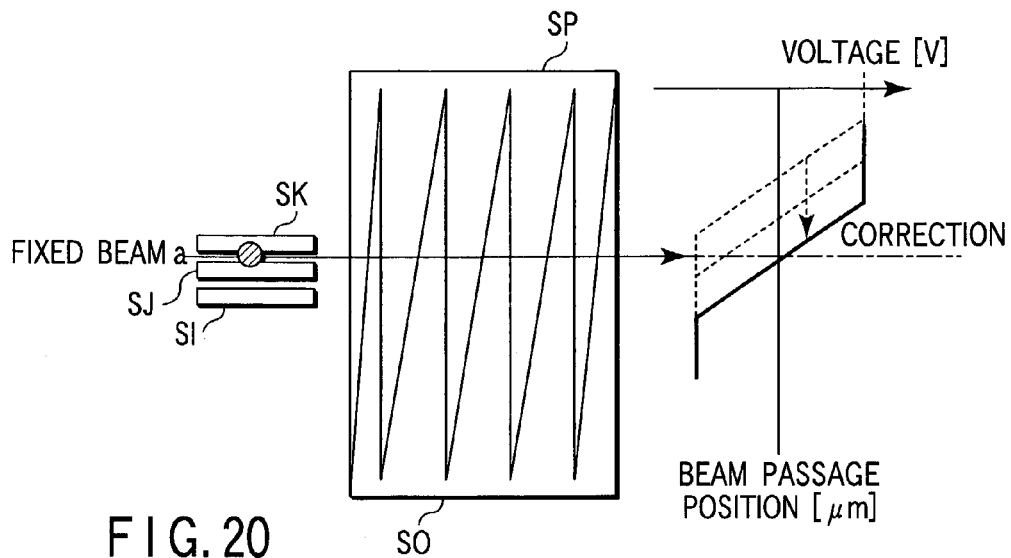
FIG. 20 shows a specific example of a relative position control according to an embodiment of the invention.

In a case where there is an offset in an opposite direction as shown in FIG. 19 (upward in FIG. 19), the measurement and control are similarly performed after making a correction to shift the beam position to a measurable position.

A prior-art control operation will now be described with reference to a flow chart of FIG. 21.

To start with, the main control section 51 performs an initializing operation for the fixed beam, as described above (S11), and confirms a horizontal sync signal of the fixed beam (S12). Then, main control section 51 performs an initializing operation for the movable beam (S13), confirms an output signal of the movable beam (S14), and measures an offset between the sensors SK, SJ and SI and the sensors SP and SO (S15).

The main control section 51 controls the movable beam so that the passage position of the movable beam may come to the center of the gap between the sensors SK and SJ (S16). After the beam position is corrected so as to be measurable by the sensors SP and SO, the main control section 51 confirms an output difference between the sensors SP and SO (S17). Then, the main control section 51 controls the movable beam so that the passage position of the movable beam may come to the center of the gap between the sensors SJ and SI (S18). After the beam position is corrected so as to be measurable by the sensors SP and SO, the main control section 51 confirms an output difference between the sensors SP and SO (S19).

The main control section 51 confirms an output difference between the sensors SP and SO with respect to the fixed beam (S20), and executes a relative position control (S21).

In the case of the prior-art control method, the following problem arises. That is, even if the passage position of the movable beam a is controlled to come to the center of the gap between the sensors SK and SJ or the center of the gap between the sensors SJ and SI, the movable beam may deviate from a position where measurement and control are to be actually performed, due to a drift or a time-dependent variation of the galvano-mirror while the beam position is being corrected to the measurable position. This prevents exact measurement and control.

The control operation according to the first embodiment will now be described with reference to a flow chart of FIG. 22.

Steps S11 to S15 are common to the prior-art control operation, so the same step numbers are used and a description thereof is omitted.

Following step S15, the main control section 51 controls the movable beam a so that the passage position thereof may come to the center of the gap between the sensors SK and SJ (S31), and the main control section 51 confirms an output difference between the sensors SP and SO (S32). In this case, the main control section 51 successively measures an output difference between the sensors SP and SO while moving the movable beam a to the center of the gap between the sensors SK and SJ.

Figure 23:
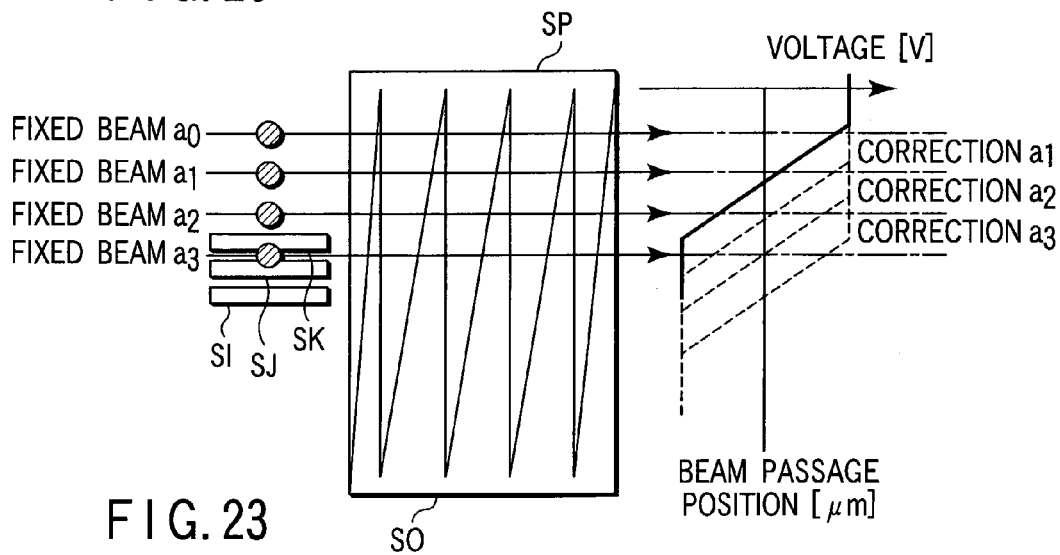
FIG. 23 shows a specific example of a relative position control according to the embodiment of the invention.

FIG. 23 illustrates a process of moving the beam a to the center of the gap between the sensors SK and SJ in the first embodiment (i.e. controlling and moving the passage position of the beam a to the center stepwise or by one or more operations with a predetermined amount or a given amount).

As is shown in FIG. 23, the main control section 51 first confirms an output difference between the sensors SP and SO at the position of a beam $a_0$ relative to the sensors SK and SJ (S31, S32). In this case, after the beam position is corrected to a measurable position, the outputs from the sensor SP and SO are measured.

After confirming the output difference between the sensors SP and SO (S33), the main control section 51 further confirms an output difference between the sensors SP and SO at the position of a beam $a_1$ relative to the sensors SK and SJ (S31, S32). In this case, after the beam position is corrected to a measurable point of correction $a_1$, the outputs from the sensor SP and SO are measured (if there is no need of correction, no correction is made).

After confirming the output difference between the sensors SP and SO (S33), the main control section 51 further confirms an output difference between the sensors SP and SO at the position of a beam $a_2$ relative to the sensors SK and SJ (S31, S32). In this case, after the beam position is corrected to a measurable point of correction $a_2$, the outputs from the sensor SP and SO are measured (if there is no need of correction, no correction is made).

After confirming the output difference between the sensors SP and SO (S33), the main control section 51 further confirms an output difference between the sensors SP and SO at the position of a beam $a_3$ relative to the sensors SK and SJ (S31, S32). In this case, after the beam position is corrected to a measurable point of correction $a_3$, the outputs from the sensor SP and SO are measured (if there is no need of correction, no correction is made).

When the beam a is finally moved to the center position (position of beam $a_3$) of the gap between the sensors SK and SJ, the main control section 51 confirms the output difference between the sensors SP and SO at the position of beam $a_3$ (S31, S32), and finishes the movement control. Then, the control operation advances to the next step (S33).

In this case, when the output difference between the sensors SP and SO is confirmed, the correction $a_3$ is already made in the previous operation and thus there is no need of correction. It is therefore possible to move the beam a to the center of the gap between the sensors SK and SJ and to immediately confirm the output difference between the sensors SP and SO. Thereby, more exact measurement and control can be performed, with less effect of a drift or a time-dependent variation of the galvano-mirror.

Figure 24:
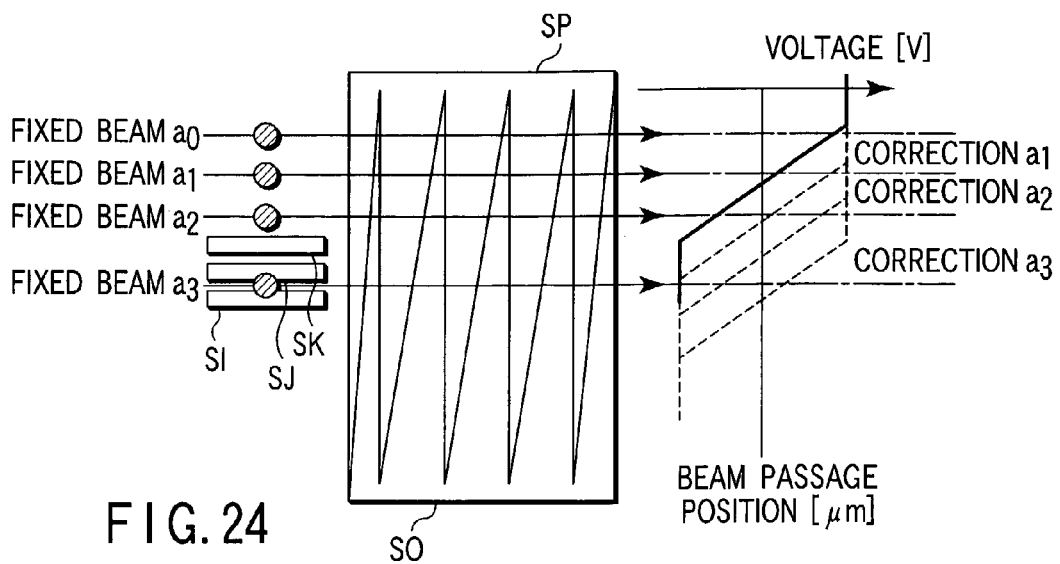
FIG. 24 shows a specific example of a relative position control according to the embodiment of the invention.

FIG. 24 illustrates a process of moving the beam a to the center of the gap between the sensors SJ and SI in the first embodiment.

As is shown in FIG. 24, the main control section 51 first confirms an output difference between the sensors SP and SO at the position of a beam $a_0$ relative to the sensors SJ and SI (S34, S35). In this case, after the beam position is corrected to a measurable position, the outputs from the sensor SP and SO are measured.

After confirming the output difference between the sensors SP and SO (S36), the main control section 51 further confirms an output difference between the sensors SP and SO at the position of a beam al relative to the sensors SJ and SI (S34, S35). In this case, after the beam position is corrected to a measurable point of correction $a_1$, the outputs from the sensor SP and SO are measured.

After confirming the output difference between the sensors SP and SO (S36), the main control section 51 further confirms an output difference between the sensors SP and SO at the position of a beam $a_2$ relative to the sensors SJ and SI (S34, S35). In this case, after the beam position is corrected to a measurable point of correction $a_2$, the outputs from the sensor SP and SO are measured (if there is no need of correction, no correction is made).

After confirming the output difference between the sensors SP and SO (S36), the main control section 51 further confirms an output difference between the sensors SP and SO at the position of a beam $a_3$ relative to the sensors SJ and SI (S34, S35). In this case, after the beam position is corrected to a measurable point of correction $a_3$, the outputs from the sensor SP and SO are measured (if there is no need of correction, no correction is made).

When the beam a is finally moved to the center position (position of beam $a_3$) of the gap between the sensors SJ and SI, the main control section 51 confirms the output difference between the sensors SP and SO at the position of beam $a_3$ (S34, S35), and finishes the movement control. Then, the control operation advances to the next step (S36).

In this case, when the output difference between the sensors SP and SO is confirmed, the correction $a_3$ is already made in the previous operation and thus there is no need of correction. It is therefore possible to move the beam a to the center of the gap between the sensors SJ and SI and to immediately confirm the output difference between the sensors SP and SO. Thereby, more exact measurement and control can be performed, with less effect of a drift or a time-dependent variation of the galvano-mirror.

Subsequently, the main control section 51 confirms an output difference between the sensors SP and SO with respect to the fixed beam (S37), and executes a relative position control (S38).

A second embodiment of the invention will now be described.

In the second embodiment, where there are a plurality of movable beams, each beam is not moved singly to the sensors SK and SJ and the sensors SJ and SI. Two beams are moved together little by little, and an output difference between the sensors SP and SO is measured. Thereby, more exact measurement and control can be performed, with less effect of a drift or a time-dependent variation of the galvano-mirror.

The control operation according to the second embodiment will now be described with reference to a flow chart of FIG. 25.

Steps S11 to S15 are common to the prior-art control operation, so the same step numbers are used and a description thereof is omitted.

Following step S15, the main control section 51 controls the movable beam a so that the passage position thereof may come to the center of the gap between the sensors SK and SJ (S41), and measures an output difference between the sensors SP and SO (S42). Further, the main control section 51 controls the movable beam a so that the passage position thereof may come to the center of the gap between the sensors SJ and SI (S43), and measures an output difference between the sensors SP and SO (S44). Steps S41 to S44 are repeated until the beam passage position comes to the center of the gap between the sensors SK and SJ and the center of the gap between the sensors SJ and SI (S45).

When the beam a is finally moved to the center position of the gap between the sensors SK and SJ (S41), the main control section 51 confirms the output difference between the sensors SP and SO (S42). Further, when the beam a is finally moved to the center position of the gap between the sensors SJ and SI (S43), the main control section 51 confirms the output difference between the sensors SP and SO (S44), and finishes the movement control. Then, the control operation advances to the next step (S45).

Subsequently, the main control section 51 confirms an output difference between the sensors SP and SO with respect to the fixed beam (S46), and executes a relative position control (S47).

A third embodiment of the invention will now be described.

Figure 21:
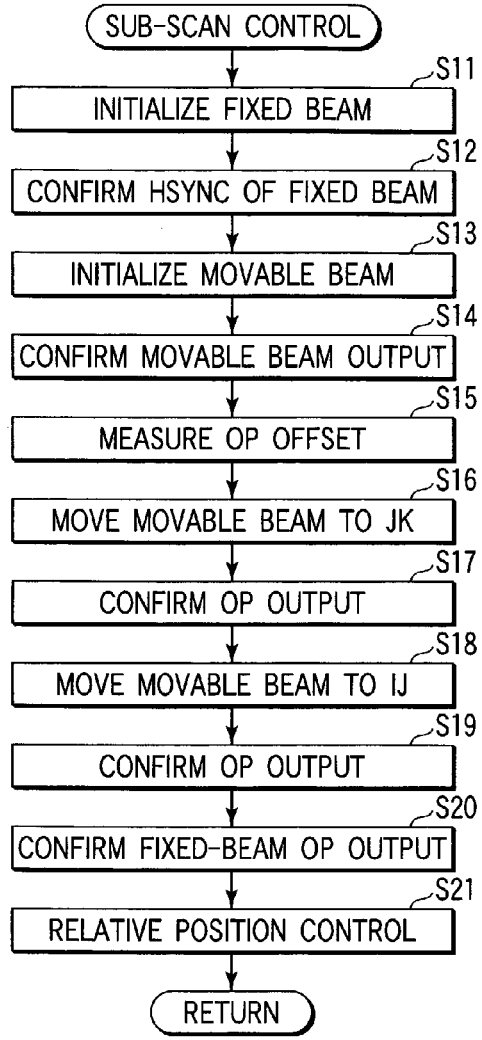
FIG. 21 is a flow chart illustrating a prior-art sub-scan control.
Figure 26:
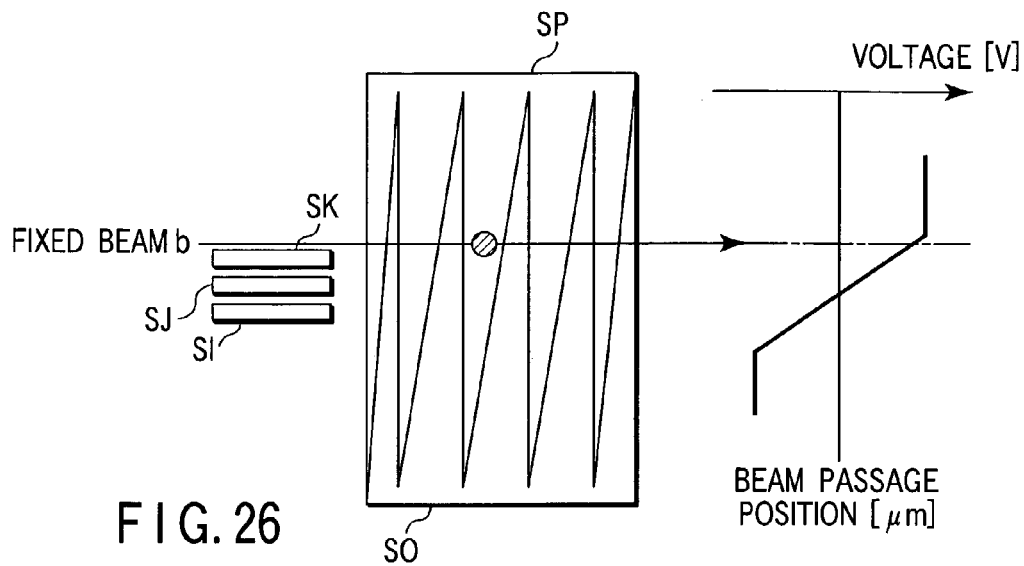
FIG. 26 illustrates a specific example in which the position of a fixed beam is detected.

In the prior-art sub-scan control illustrated in FIG. 21, the movable beam a is moved to the sensors SK and SJ and sensors SJ and SI, and an output difference between the sensors SP and SO is measured. Thereafter, as illustrated in FIG. 26, the position of the fixed beam b is confirmed.

Figure 27:
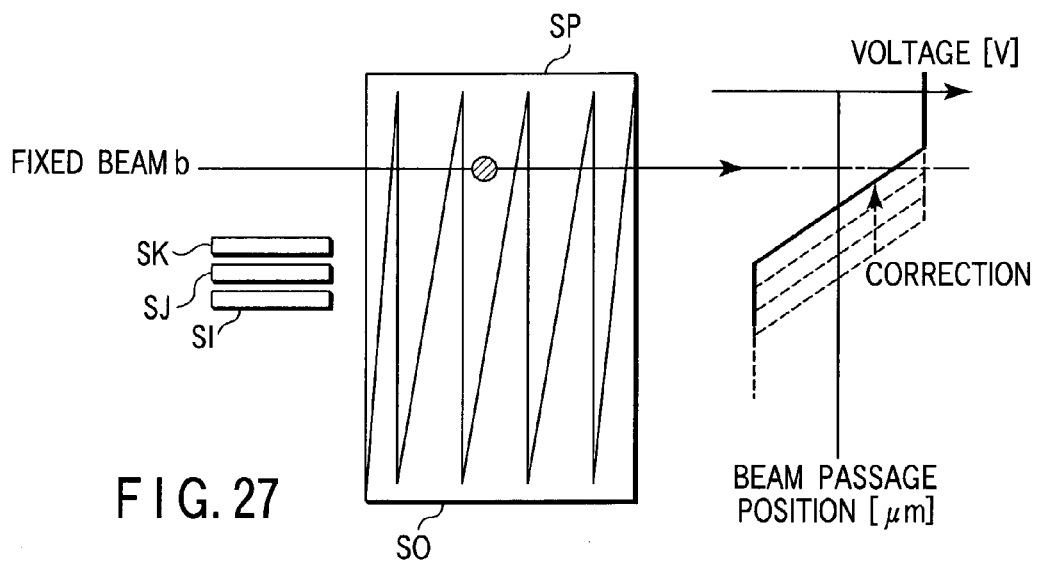
FIG. 27 illustrates a specific example in which the position of the fixed beam is detected.
Figure 28:
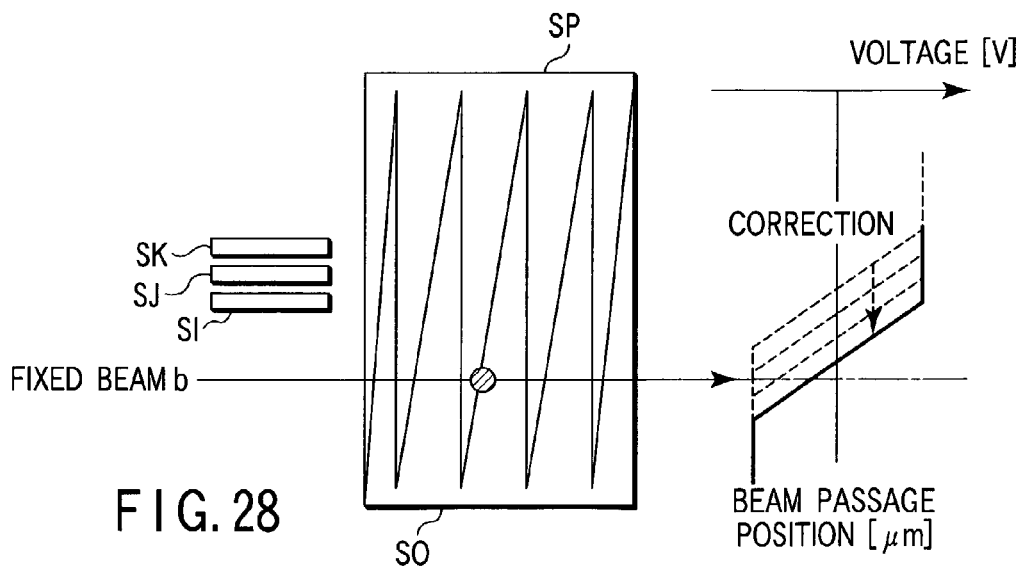
FIG. 28 illustrates a specific example in which the position of the fixed beam is detected.

However, owing to the position of the fixed beam b or due to the effect of, e.g. an offset of the circuitry required until the output difference between the sensors SP and SO is acquired, the measurement and control need to be performed after the fixed beam position is corrected to come to a measurable point, as shown in FIGS. 27 and 28 (if there is no need of correction, no correction is made).

If the sensitivity of the sensors SP and SO varies due to temperatures, etc. while the position of the fixed beam b is corrected to come to a measurable point, the sensitivity would differ from that at the time of measuring the output difference between the sensors SP and SO by moving the movable beam a. Consequently, an exact control may not be performed.

To cope with the above problem, in the third embodiment, a time difference is eliminated between the time of measuring the output difference between the sensors SP and SO by moving the movable beam a and the time of measuring the position of the fixed light beam. That is, by measuring the fixed beam position while measuring the output difference between the sensors SP and SO by moving the movable beam a, more exact measurement and control can be performed, with less effect of a drift or a time-dependent variation of the galvano-mirror.

The control operation according to the third embodiment will now be described with reference to a flow chart of FIG. 29.

Steps S11 to S15 are common to the prior-art control operation, so the same step numbers are used and a description thereof is omitted.

Following step S15, the main control section 51 controls the movable beam a so that the passage position thereof may come to the center of the gap between the sensors SK and SJ (S51), and measures an output difference between the sensors SP and SO (S52). Further, the main control section 51 controls the movable beam a so that the passage position thereof may come to the center of the gap between the sensors SJ and SI (S53), and measures an output difference between the sensors SP and SO (S54). Then, the main control section 51 confirms an output difference between the sensors SP and SO with respect to the fixed beam b (S55), and steps S51 to S55 are repeated until the beam passage position comes to the center of the gap between the sensors SK and SJ and the center of the gap between the sensors SJ and SI (S56).

When the beam a is finally moved to the center position of the gap between the sensors SK and SJ (S51), the main control section 51 confirms the output difference between the sensors SP and SO (S52). Further, when the beam a is finally moved to the center position of the gap between the sensors SJ and SI (S53), the main control section 51 confirms the output difference between the sensors SP and SO (S54) and also confirms the output difference between the sensors SP and SO with respect to the fixed beam b (S55), and finishes the movement control. Then, the control operation advances to the next step (S56).

Subsequently, the main control section 51 executes a relative position control (S57).

A fourth embodiment of the invention will now be described.

Figure 30:
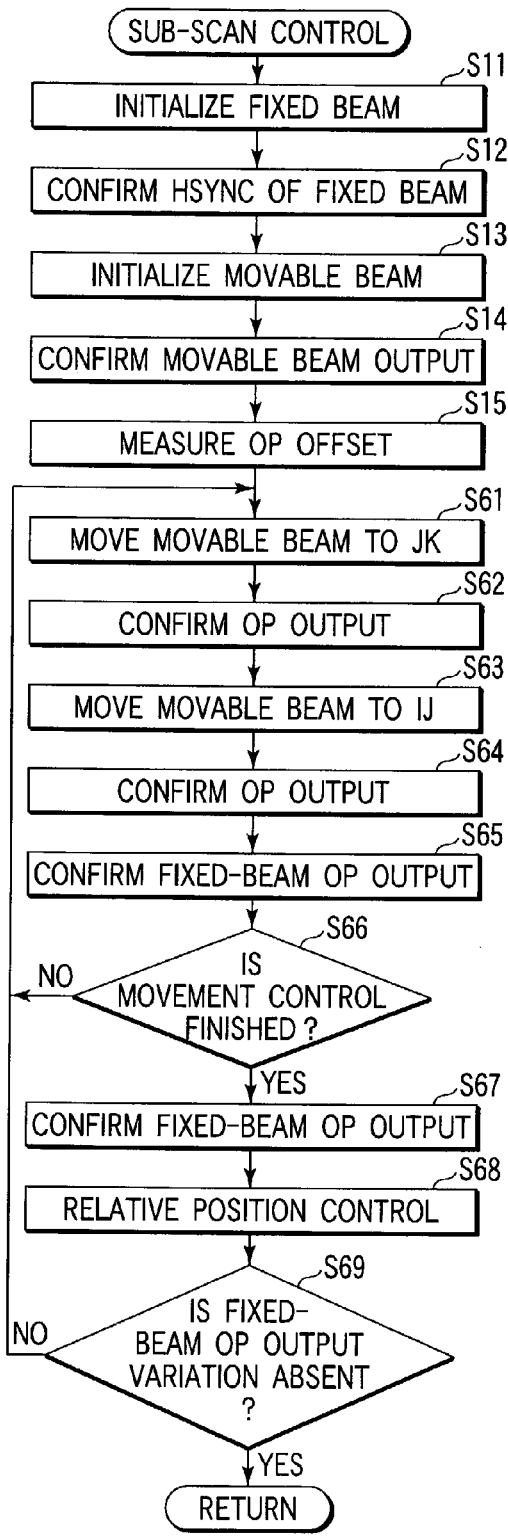
FIG. 30 is a flow chart illustrating a sub-scan control according to a fourth embodiment of the invention.
Figure 31:
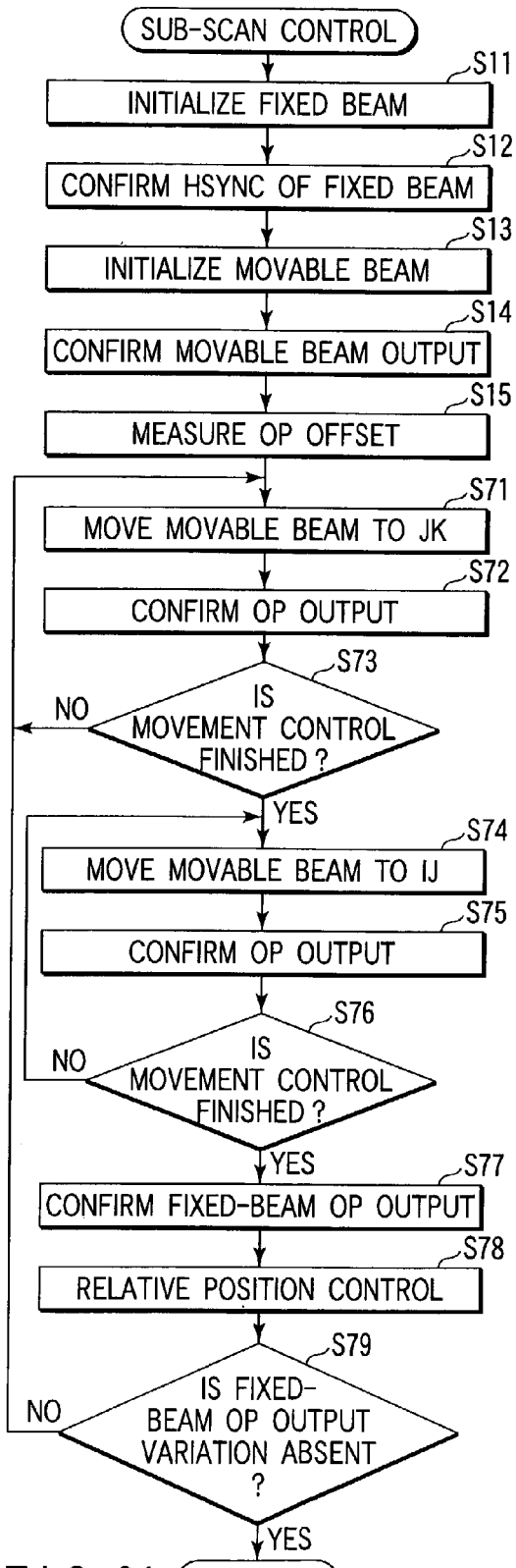
FIG. 31 is a flow chart illustrating the sub-scan control according to the fourth embodiment of the invention.

FIG. 30 shows a case where a plurality of movable beams are provided, and FIG. 31 shows a case where a single movable beam is provided. In these cases, after the above-described movement control is finished, a confirmation control is additionally performed to check whether an exact control has been effected.

Specifically, after the relative position control is performed to control the movable beam at a predetermined distance relative to the fixed beam, the position of the fixed beam is further confirmed. If the confirmed position value differs from the previous measurement value, the measurement and control for the movable beam are performed once again.

In addition, if the confirmed position value differs from the previous measurement value of the fixed beam position due to vibration, etc. despite the control being performed many times, the control would be performed endlessly. Thus, in order to finish the control, the control is performed a predetermined number of times in such a case, and then the last measurement value is deemed to be the measurement value and the control advances to the next procedure.

Thereby, the relative position control (the control to set the movable beam at a predetermined distance relative to the fixed beam) can be performed more exactly.

The control operation according to the fourth embodiment, wherein a plurality of movable beams are provided, will now be described with reference to a flow chart of FIG. 30.

Steps S11 to S15 are common to the prior-art control operation, so the same step numbers are used and a description thereof is omitted.

In addition, steps S61 to S66 are common to steps S51 to S56 illustrated in FIG. 29, so a description thereof is omitted.

Following the completion of the movement control (S66), the main control section 51 confirms an output difference between the sensors SP and SO with respect to the fixed beam b (S67) and performs a relative position control (S68). Then, the main control section 51 confirms an output difference between the sensors SP and SO with respect to the fixed beam b once again (S69). If the output difference at this time differs from that confirmed in step S67, the measurement and control for the movable beam are performed once again from step S61.

The control operation according to the fourth embodiment, wherein a single light beam is provided, will now be described with reference to a flow chart of FIG. 31.

Steps S11 to S15 are common to the prior-art control operation, so the same step numbers are used and a description thereof is omitted.

Figure 22:
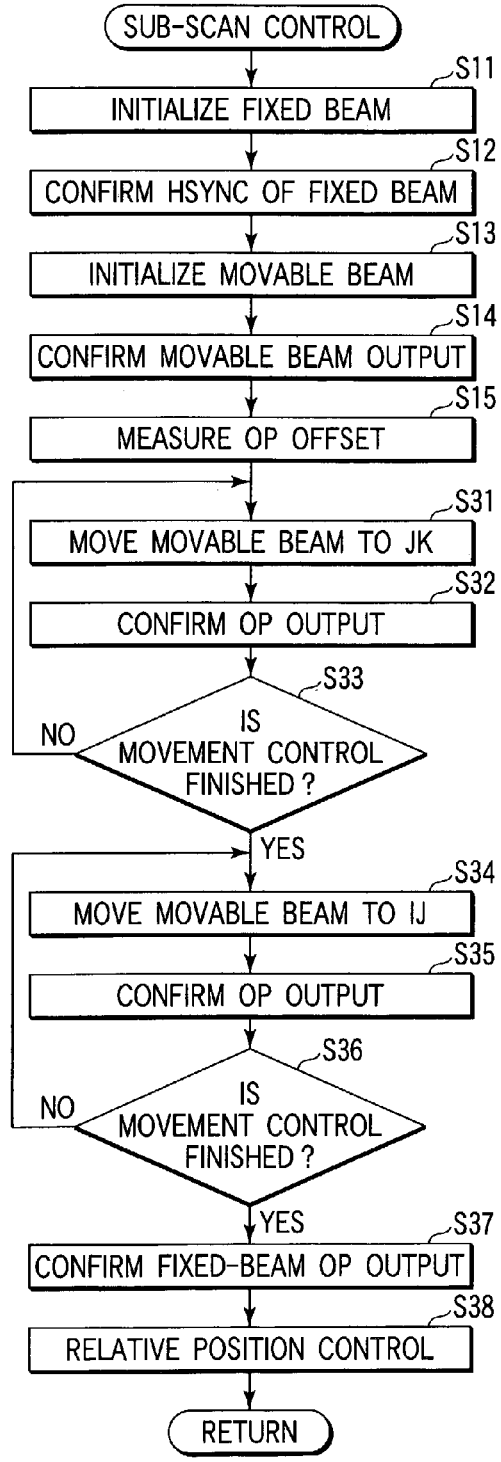
FIG. 22 is a flow chart illustrating a sub-scan control according to a first embodiment of the invention.

In addition, steps S71 to S76 are common to steps S31 to S36 illustrated in FIG. 22, so a description thereof is omitted.

Following the completion of the movement control (S76), the main control section 51 confirms an output difference between the sensors SP and SO with respect to the fixed beam b (S77) and performs a relative position control (S78). Then, the main control section 51 confirms an output difference between the sensors SP and SO with respect to the fixed beam b once again (S79). If the output difference at this time differs from that confirmed in step S77, the measurement and control for the movable beam are performed once again from step S71.

A fifth embodiment of the invention will now be described.

In the fourth embodiment, it is checked whether the fixed beam position varies, and if the fixed beam position varies, the measurement is performed once again. This is time-consuming.

Figure 32:
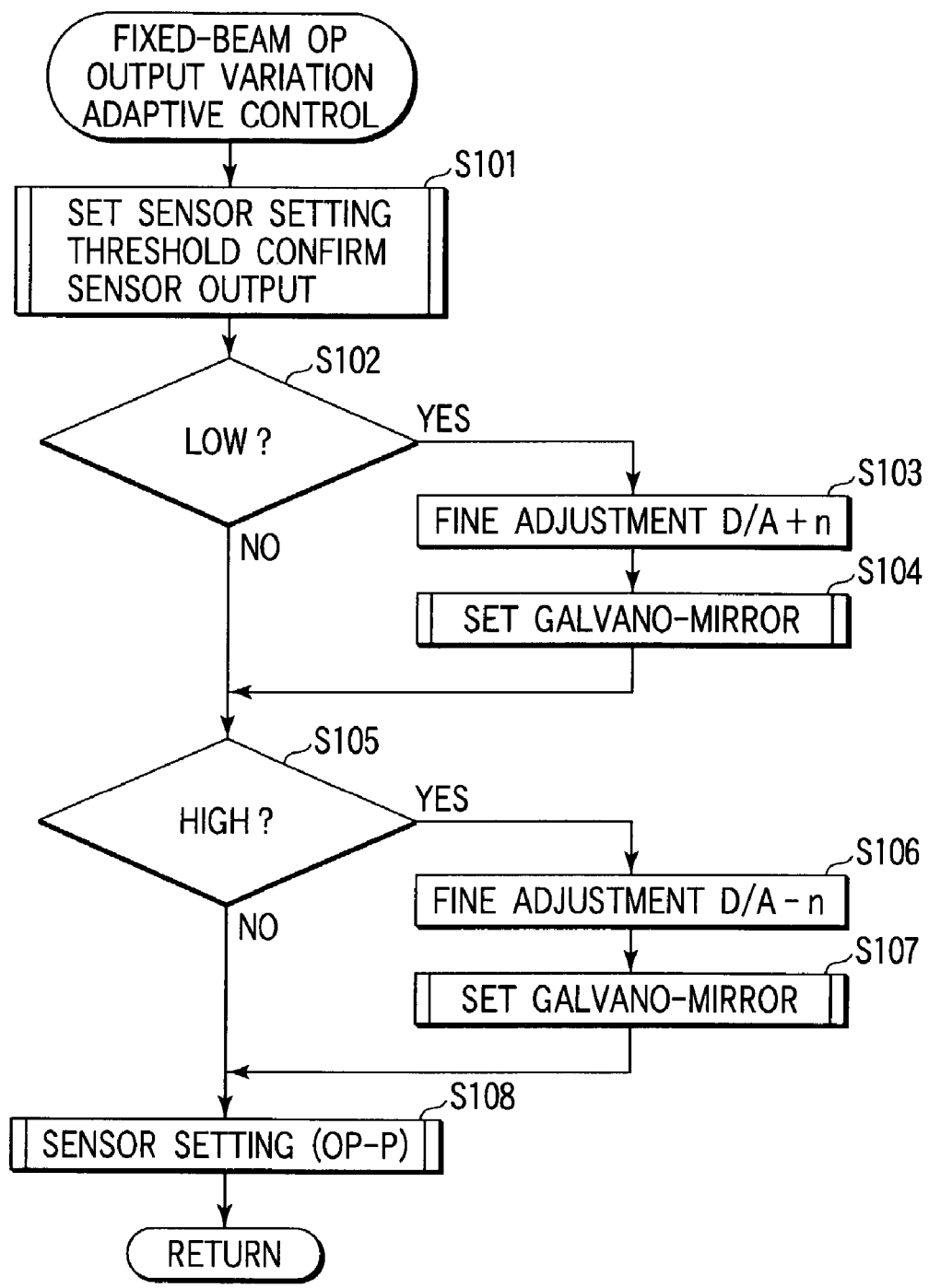
FIG. 32 is a flow chart illustrating a fixed-beam output variation adaptive control.

In the fifth embodiment, if the output difference between the sensors SP and SO varies, a fixed-beam OP output variation adaptive control is performed, as illustrated in FIG. 32. Thereby, high-quality printing is performed in a short time period.

Figure 33:
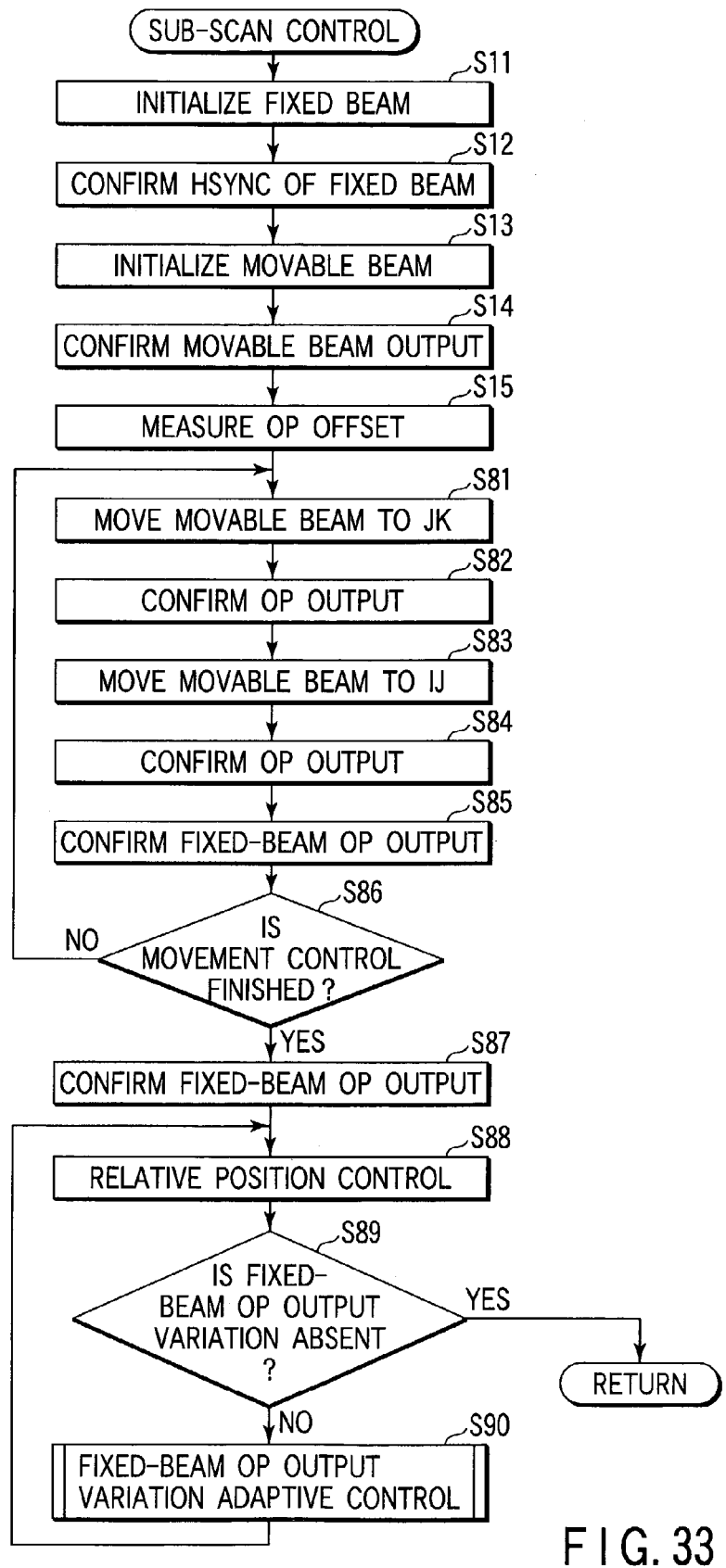
FIG. 33 is a flow chart illustrating a sub-scan control according to a fifth embodiment of the invention.
Figure 34:
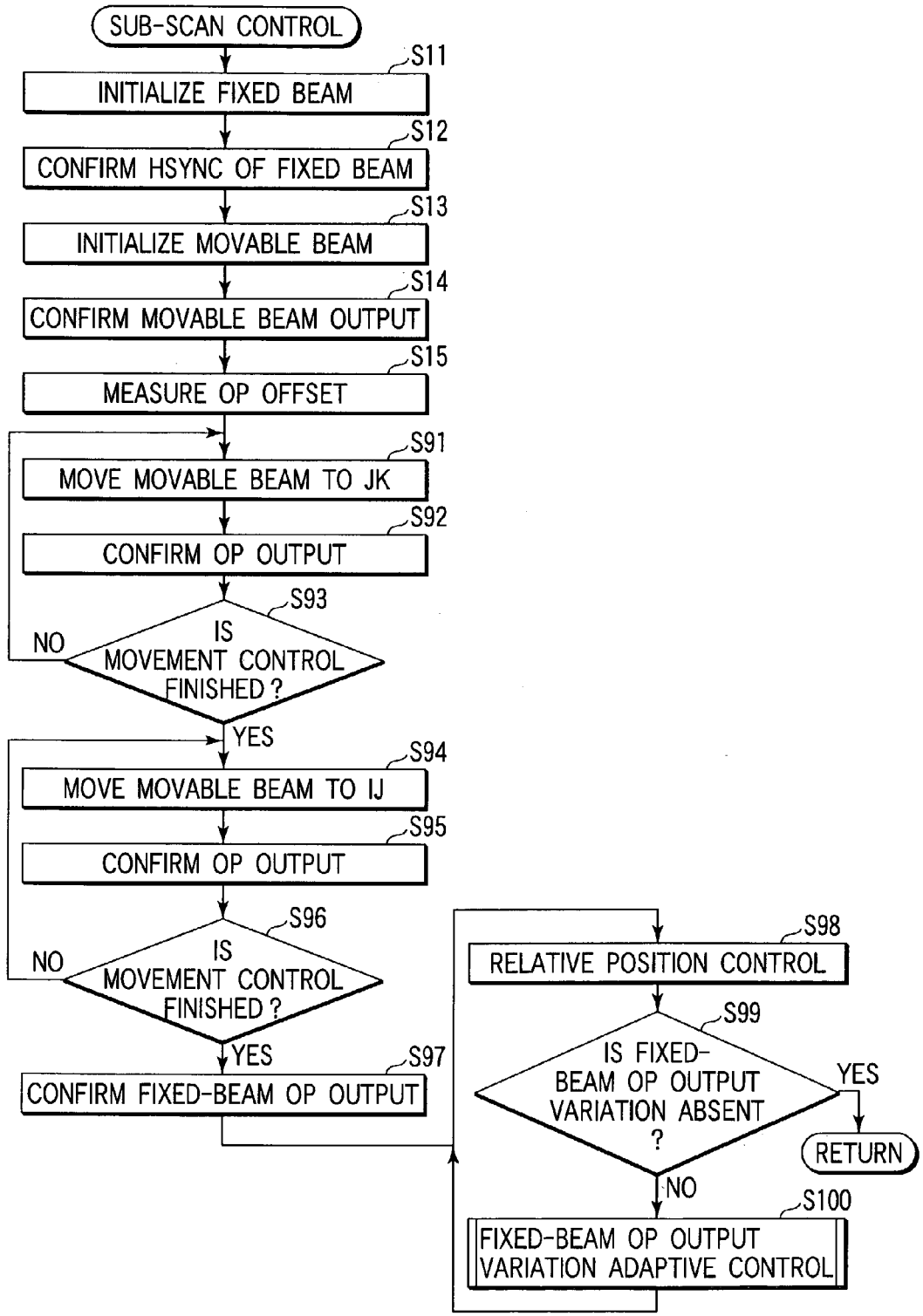
FIG. 34 is a flow chart illustrating the sub-scan control according to the fifth embodiment of the invention.

FIG. 33 is a flow chart relating to the shift to the fixed-beam OP output variation adaptive control in a case where there are a plurality of movable beams, and FIG. 34 is a flow chart relating to the shift to the fixed-beam OP output variation adaptive control in a case where there is a single movable beam.

As illustrated in the flow chart of FIG. 33, if the fixed beam position varies (S89), the control shifts to the fixed-beam OP output variation adaptive control (S90). After the completion of this control, the control flow returns to step S88.

On the other hand, as illustrated in the flow chart of FIG. 34, if the fixed beam position varies (S99), the control shifts to the fixed-beam OP output variation adaptive control (S100). After the completion of this control, the control flow returns to step S98.

Next, the operation of the fixed-beam OP output variation adaptive control will be described with reference to a flow chart of FIG. 32.

If the output difference between the sensors SP and SO varies (S101), the main control section 51 uses the window comparator 75 to confirm whether the present value is on the LOW side with reference to the previous value (S102).

If the present value is on the LOW side, the main control section 51 moves the galvano-mirror in the opposite direction by a predetermined step number (n) (S103, S104). Note that the number (n) is not set at an excessively large value.

If the present value is not on the LOW side in step S102, the main control section 51 uses the window comparator 75 to confirm whether the present value is on the HIGH side with reference to the previous value (S105).

If the present value is on the HIGH side, the main control section 51 moves the galvano-mirror in the opposite direction by a predetermined step number (n) (S106, S107). Note that the number (n) is not set at an excessively large value.

Thus, the main control section 51 performs sensor setting (OP-P) (S108).

In this way, the beam position is controlled to come closer to a position where the actual control is to be performed.

A sixth embodiment of the present invention will now be described.

When successive printing is performed by a digital copying machine, there is a time interval between the output of a sheet and the output of the next sheet. In the time interval, an inter-sheet sub-scan control is performed. In the inter-sheet time interval, a main scan control, etc. are also performed. In the control of the sixth embodiment, the above-described fixed-beam OP output variation adaptive control illustrated in FIG. 32 is performed in the inter-sheet time interval.

Figure 35:
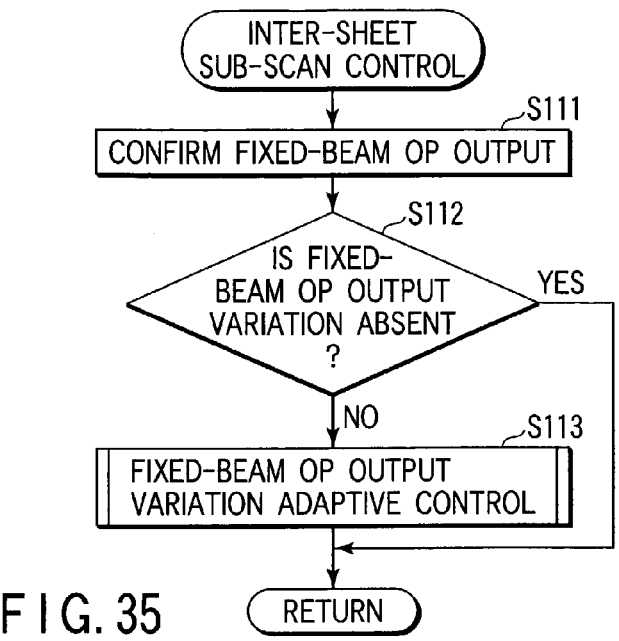
FIG. 35 is a flow chart illustrating an inter-sheet sub-scan control according to a sixth embodiment of the invention.

The operation of the sixth embodiment will now be described with reference to a flow chart of FIG. 35.

During the inter-sheet time interval, the main control section 51 confirms an output difference between the sensors SP and SO with respect to the fixed beam b (S111). If the output difference between the sensors SP and SO varies (S112), the fixed-beam OP output variation adaptive control is performed (S113).

According to this control, as the step number (n) of the galvano-mirror is decreased and as the successive printing is performed more and more (finally, the position becomes a target value ±n step), the movable beam can be controlled to come to the target control position even if there is a drift or a time-dependent variation of the galvano-mirror.

A seventh embodiment of the invention will now be described.

A standby sub-scan control is performed in a standby state at a time after completion of all controls in a digital copying machine and before an image output signal is produced by, e.g. depression of a copy button.

In the seventh embodiment, the above-described fixed-beam OP output variation adaptive control illustrated in FIG. 32 is performed in the standby state.

Figure 36:
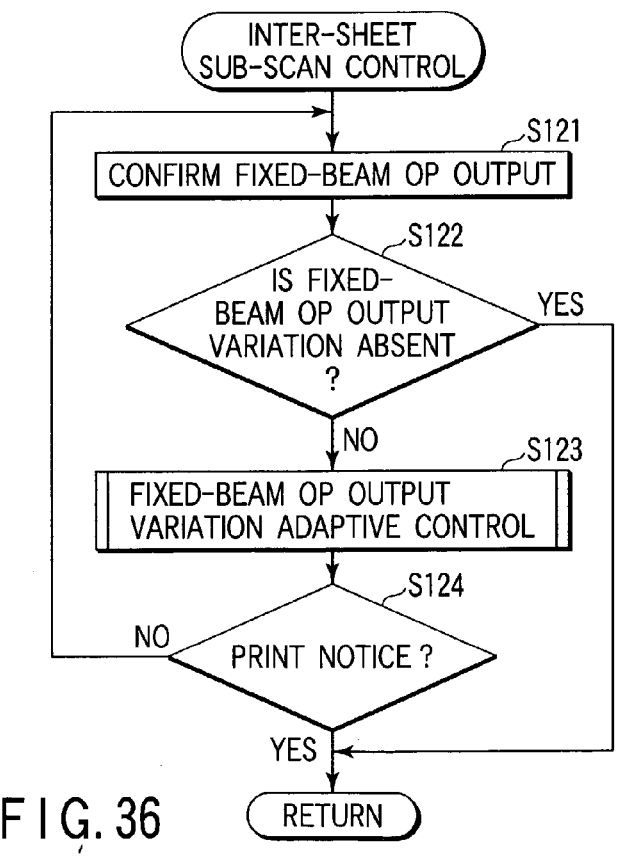
FIG. 36 is a flow chart illustrating a standby sub-scan control according to a seventh embodiment of the invention.

The operation of the seventh embodiment will now be described with reference to a flow chart of FIG. 36.

In the standby state, the main control section 51 confirms an output difference between the sensors SP and SO with respect to the fixed beam b (S121). If the output difference between the sensors SP and SO varies (S122), the above-described fixed-beam OP output variation adaptive control is executed (S123).

If there is no print notice (S124), the main control section 51 advances to step S121 and executes the control.

According to this control, as the step number (n) of the galvano-mirror is decreased and as the standby time is longer (finally, the position becomes a target value ±n step), the movable beam can be controlled to come to the target control position even if there is a drift or a time-dependent variation of the galvano-mirror.

An eighth embodiment of the invention will now be described.

Figure 37:
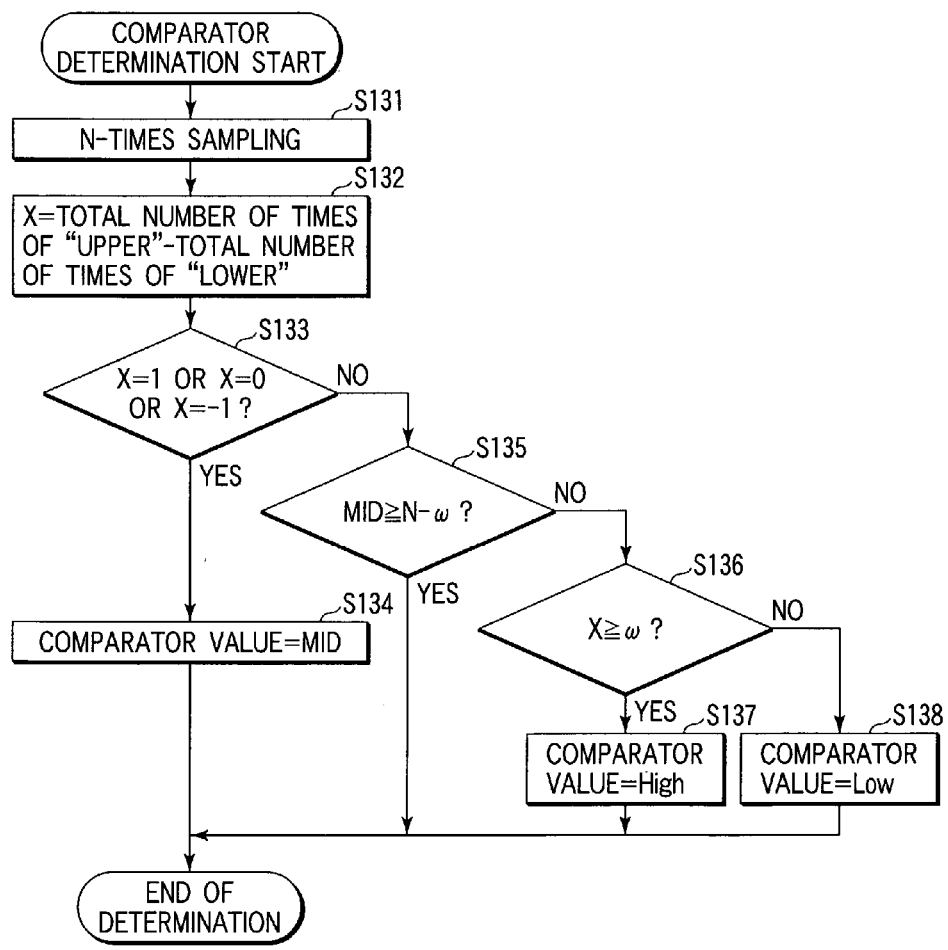
FIG. 37 is a flow chart illustrating determination by a conventional window comparator.

When the beam position is detected, as mentioned above, the window comparator 75 is used to adjust the instruction range and determine the "upper", "middle" and "lower" in the range, thereby performing the measurement. As illustrated in the flow chart of FIG. 37, the determination of the "upper", "middle" and "lower" is performed by acquiring data of "N=the number of polygon facets×a given any value".

However, the threshold of the range in the window comparator 75 is set from the main control section 51 via the D/A converter 76. Thus, a length of time is consumed between the setting and outputting of the value. Consequently, data may not be acquired before the set value is output, and exact determination may not be effected.

In the determination in the eighth embodiment, as illustrated in the flow chart of FIG. 38, a number of data units corresponding to "(n+the number of polygon facets)×(a given any value)" are acquired (S141), and an n-number of data units, which are first acquired, are ignored. Then, determination is performed on the basis of subsequently acquired data units corresponding to "{(n+the number of polygon facets)×(a given value)}−(n×a given number)", that is, "(the number of polygon facets)×a given any number". Note that "n" is a given number corresponding to the time period between the setting in the D/A converter 76 of the threshold of the range of the window comparator 75 and the outputting of the threshold.

In short, by the sampling in step S141, exact determination can be performed even when a length of time is needed between the setting in the D/A converter 76 of the threshold of the range of the window comparator 75 and the outputting of the threshold value, or even when a length of time is needed between the setting of laser power and the emission of a laser light beam with a predetermined power.

A ninth embodiment of the invention will now be described.

There is a case where data set in the D/A converters 45b, 45c and 45d may frequently be rewritten due to noise, etc.

In the ninth embodiment, when data is output to the D/A converters 45b, 45c and 45d that control the galvano-mirrors 33b, 33c and 33d, data is overwritten not only in the D/A converter that requires change, but also in all the D/A converters 45b, 45c and 45d. Further, periodical overwrite (refresh) is performed in the D/A converters 45b, 45c and 45d.

Thereby, the precision of a beam position control that may lead to an image quality degradation can exactly be maintained.

As has been described above, according to the embodiments of the present invention, a control is performed in consideration of a drift of the galvano-mirror. Thereby, a control with higher precision can be performed.

In addition, whether there is an effect of drift of the galvano-mirror is confirmed at the time of control. Thereby, a control with higher precision can be performed.

At the time of determination by the window comparator, data units corresponding to "n+the number of required polygon facets" are acquired. First n-number data units, which are acquired in a time period between the setting of the threshold of the range in the window comparator and the outputting of the set value, are not used. Thereby, exact determination can be performed, despite a time lag at the time of setting the window comparator.

Furthermore, when data is output to the D/A converters that control the galvano-mirrors, data is overwritten not only in the D/A converter that requires change, but also in all the D/A converters. Further, periodical overwrite (refresh) is performed in the D/A converters. Thereby, the precision of a beam position control that may lead to an image quality degradation can exactly be maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:

light-emission means for outputting a light beam;

light beam scanning means for scanning the light beam from the light-emission means over a to-be-scanned surface so as to scan the to-be-scanned surface in a main scan direction;

first detection means for detecting a passage position of the light beam scanned by the light beam scanning means;

processing means for determining whether correction is necessary in a process relating to a detection result of the first detection means, and setting a correction amount if the correction is necessary, thus performing a process for the detection result;

altering means for altering the passage position of the light beam scanned by the light beam scanning means over the to-be-scanned surface;

second detection means for detecting whether the passage position of the light beam altered by the altering means coincides with a reference position;

first control means for altering, if the passage position of the light beam detected by the second detection means is not coincident with the reference position, the passage position of the light beam toward the reference position by a given amount using the altering means until the passage position comes to the reference position, and controlling the detection by the first detection means and the processing by the processing means each time alteration is made; and second control means for controlling the detection by the first detection means and a non-correction process by the processing means when the passage position of the light beam detected by the second detection means comes to the reference position by the control of the first control means.

2. The light beam scanning apparatus according to claim 1, wherein the first control means alters the passage position of the light beam toward a first reference position detected by the second detection means by a given amount using the altering means until the passage position comes to the first reference position, and controlling the detection by the first detection means and the processing by the processing means each time alteration is made, and then alters the passage position of the light beam toward a second reference position detected by the second detection means by a given amount using the altering means until the passage position comes to the second reference position, and controlling the detection by the first detection means and the processing by the processing means each time alteration is made.

* * * * *